United States Patent
Izumi

(10) Patent No.: US 10,268,101 B2
(45) Date of Patent: Apr. 23, 2019

(54) OPTICAL LOGIC CIRCUIT

(71) Applicant: FUJITSU LIMITED, Kawasaki-shi, Kanagawa (JP)

(72) Inventor: Futoshi Izumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 600 days.

(21) Appl. No.: 14/975,258

(22) Filed: Dec. 18, 2015

(65) Prior Publication Data

US 2016/0161827 A1 Jun. 9, 2016

Related U.S. Application Data

(63) Continuation of application No. PCT/JP2013/066894, filed on Jun. 19, 2013.

(51) Int. Cl.
*G02F 3/00* (2006.01)

(52) U.S. Cl.
CPC ..................................... *G02F 3/00* (2013.01)

(58) Field of Classification Search
None
See application file for complete search history.

(56) References Cited

U.S. PATENT DOCUMENTS

| | | | | |
|---|---|---|---|---|
| 4,887,877 A | * | 12/1989 | Inoue | G02F 1/3138 359/108 |
| H1296 H | * | 4/1994 | Simmons | 359/107 |
| 6,128,110 A | * | 10/2000 | Bulow | G02B 27/144 250/214 LS |
| 6,437,887 B1 | | 8/2002 | Usami et al. | |
| 2004/0085828 A1 | | 5/2004 | Kim et al. | |
| 2007/0297034 A1 | | 12/2007 | Zaghloul et al. | |
| 2008/0310000 A1 | * | 12/2008 | Beausoleil, Jr. | B82Y 10/00 359/108 |
| 2009/0116089 A1 | | 5/2009 | Bogoni et al. | |
| 2012/0127550 A1 | | 5/2012 | Zaghloul et al. | |

FOREIGN PATENT DOCUMENTS

| | | |
|---|---|---|
| JP | 10(1998)-20255 | 1/1998 |
| JP | 2000-314904 | 11/2000 |
| JP | 2009-537865 | 10/2009 |
| JP | 2010-534868 | 11/2010 |

OTHER PUBLICATIONS

Vlachos et al, "Ultrafast Time-Domain Technology and Its Application in All-Optical Signal Processing", Journal of Lightwave Technology, vol. 21, No. 9, p. 1857-1868, Sep. 2003.
International Search Report of PCT/JP2013/066894 dated Jul. 23, 2013.

* cited by examiner

*Primary Examiner* — Derek S Chapel
(74) *Attorney, Agent, or Firm* — Fujitsu Patent Center

(57) ABSTRACT

An optical logic circuit includes a NOT circuit. The NOT circuit reflects by fixed end reflection an data pulse input into the optical logic circuit which is an ON pulse of which a wavelength and an intensity are similar to a wavelength and an intensity of a standard optical pulse or an OFF pulse obtained by applying OFF modulation to the standard optical pulse. The NOT circuit multiplexes the reflected data pulse and the standard optical pulse and outputs the multiplexed pulse.

10 Claims, 26 Drawing Sheets

OPTICAL LOGIC CIRCUIT

CROSS-REFERENCE TO RELATED APPLICATION

This application is a continuation application of International Application PCT/JP2013/066894 filed on Jun. 19, 2013 and designated the U.S., the entire contents of which are incorporated herein by reference.

FIELD

The embodiments discussed herein are related to an optical logic circuit.

BACKGROUND

Optical logic circuits for performing logical operations based on optical signals have been developed. Conventional optical logic gates employed in the optical logic circuits are normally provided for performing logical operations using nonlinear optical effects.

The following patent document describes conventional techniques related to the techniques described herein.

PATENT DOCUMENTS

[Patent document 1] Japanese National Publication of International Patent Application No. 2010-534868

SUMMARY

According to one embodiment, it is provided an optical logic circuit including a NOT circuit configured to reflect by fixed end reflection an data pulse input into the optical logic circuit which is an ON pulse of which a wavelength and an intensity are similar to a wavelength and an intensity of a standard optical pulse or an OFF pulse obtained by applying OFF modulation to the standard optical pulse, multiplex the reflected data pulse and the standard optical pulse and output the multiplexed pulse.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The conventional optical logic circuits may face problems such as cross talks when a variety of optical signals with different wavelengths are input into the circuits. Consequently, accurate logical operations based on each optical signal with respective wavelength cannot be achieved.

One aspect of the present invention lies in providing an optical logic circuit for performing logical operations of a plurality of input optical signals with different wavelengths in parallel. First, one embodiment is described below with reference to the drawings.

First Embodiment

Figure 1:
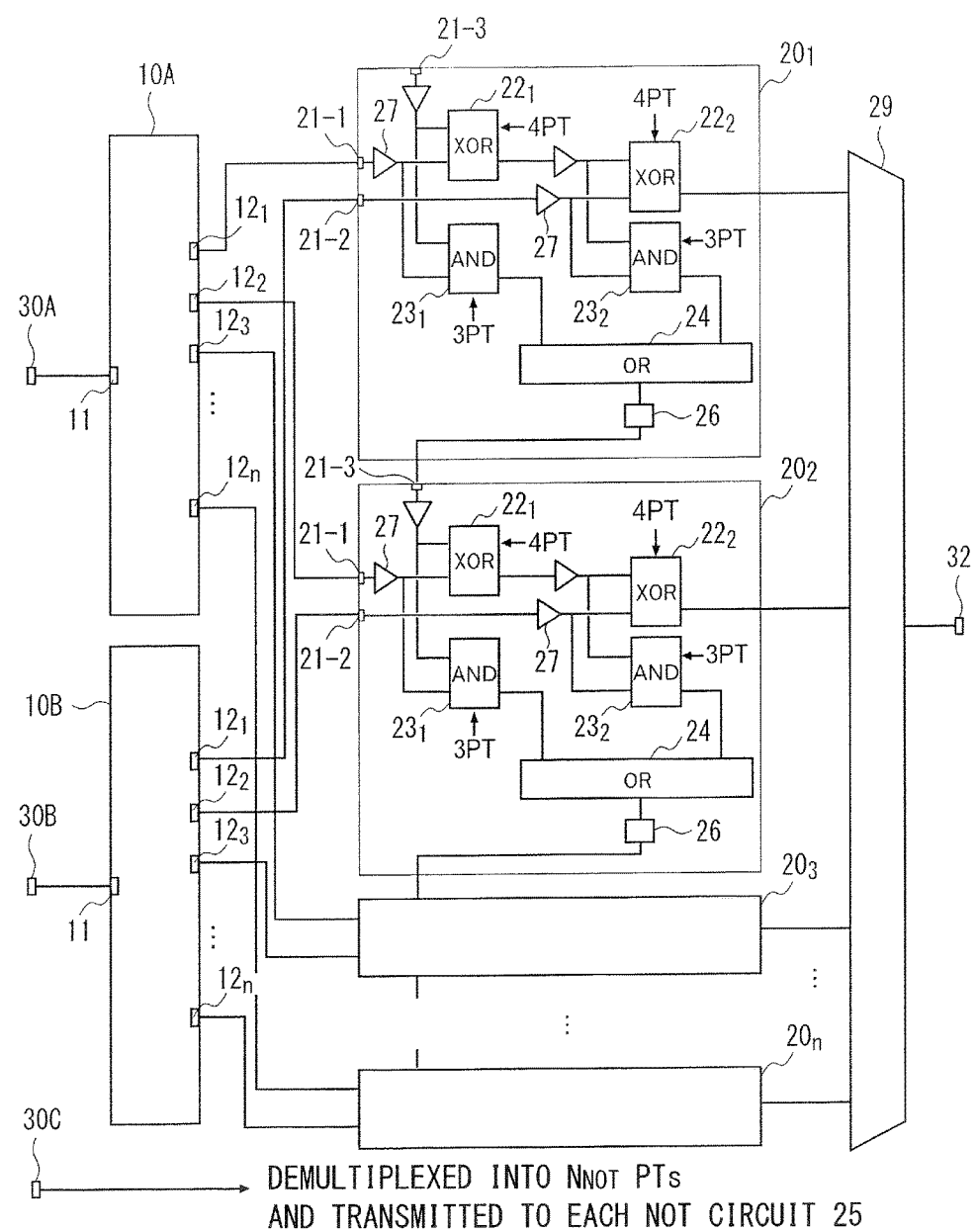
FIG. 1 is a configuration diagram schematically illustrating an optical logic circuit according to the first embodiment.

FIG. 1 schematically illustrates a configuration of an optical logic circuit according to the first embodiment.

The optical logic circuit according to the present embodiment is a circuit for performing add operations of a pair (i.e. 2 pieces) of n-bit data (n is 8, for example) and for performing add operations of m pairs (m≥2) of n-bit data simultaneously. As illustrated in FIG. 1, the optical logic circuit includes input ports 30A to 30C, optical selectors 10A and 10B, n adders $20_1$ to $20_n$, an optical multiplexer 29 and an output port 32.

Prior to describing the details of the optical logic circuit according to the present embodiment, a method of using the optical logic circuit to perform an add operation of a pair of n-bit data and a method of using the optical logic circuit to perform add operations of m pairs of n-bit data simultaneously are described.

Figure 2:
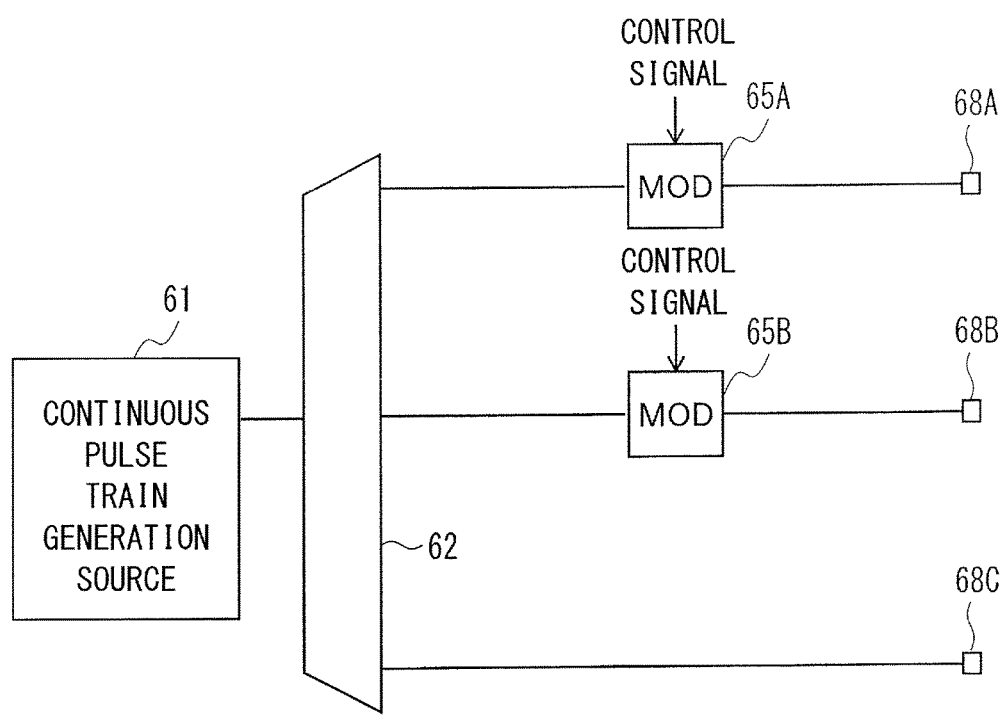
FIG. 2 is a configuration diagram schematically illustrating the first signal generation apparatus for providing optical signals for an optical logic circuit.

When the optical logic circuit is used to perform an add operation of a pair of n-bit data (hereinafter referred to as data A and data B), the first optical signal generation apparatus the configuration of which is illustrated in FIG. 2 is connected to the optical logic circuit, for example.

The output ports 68A to 68C of the first optical signal generation apparatus are connected with the input ports 30A to 30C of the optical logic circuit, respectively. As illustrated in FIG. 2, the first optical signal generation apparatus also includes a continuous pulse train generation source 61, an optical demultiplexer 62 and optical modulators (MOD) 65A and 65B in addition to the output ports 68A to 68C.

The continuous pulse train generation source 61 (hereinafter referred to as generation source 61) generates a continuous pulse train which includes an optical pulse with a predetermined wavelength, a predetermined intensity and a predetermined pulse width at intervals of time T (generally, T is equal to or shorter than 1 nsec).

Figure 6:
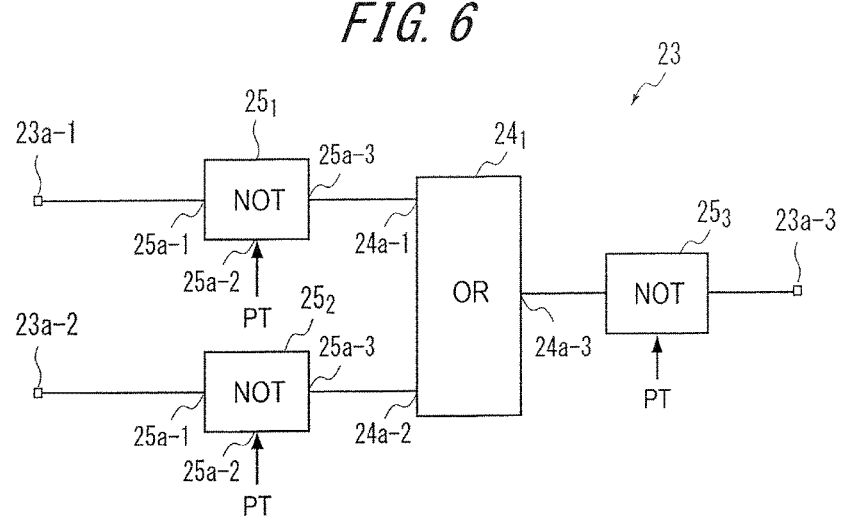
FIG. 6 is a configuration diagram schematically illustrating an AND circuit employed in an optical logic circuit according to the first embodiment.
Figure 7:
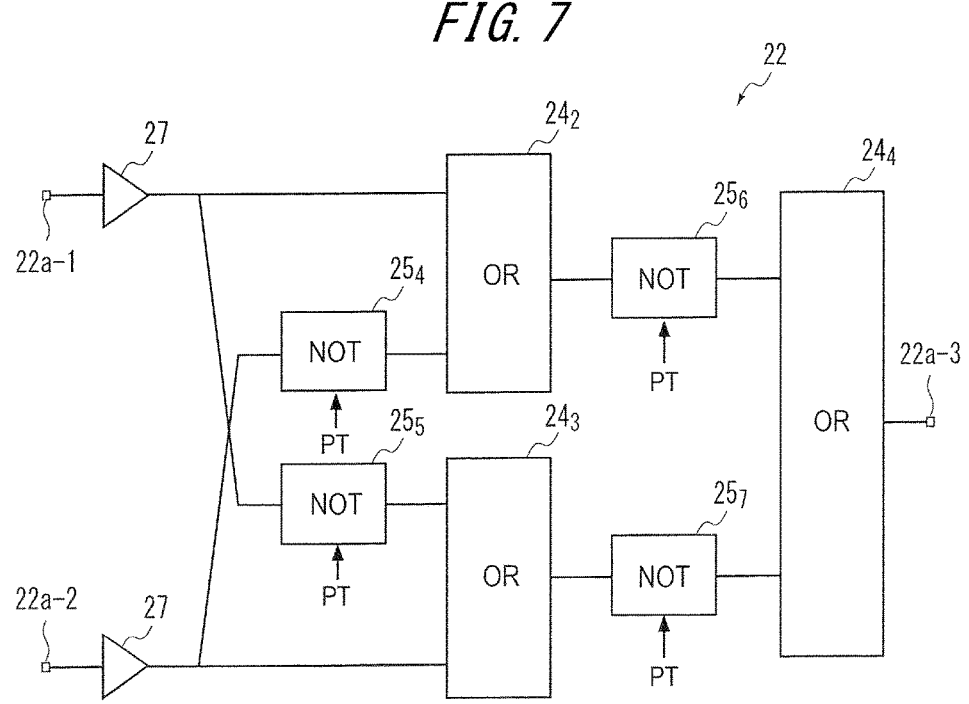
FIG. 7 is a configuration diagram schematically illustrating an XOR circuit employed in an optical logic circuit according to the first embodiment.
Figure 8:
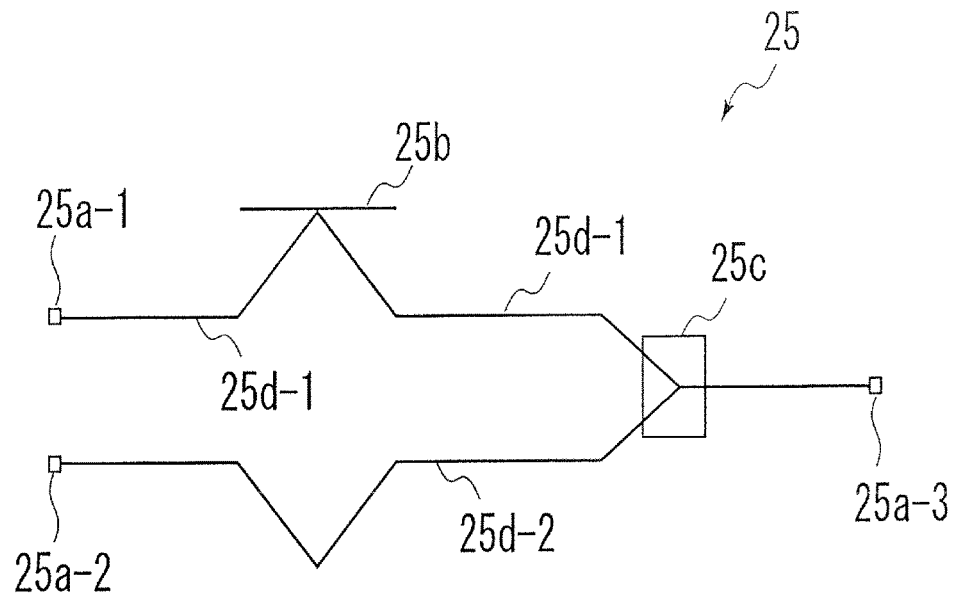
FIG. 8 is a configuration diagram schematically illustrating a NOT circuit employed in an optical logic circuit according to the first embodiment.

The optical demultiplexer 62 demultiplexes the continuous pulse train output from the generation source 61 into a pulse train as the first modulation target, a pulse train as the second modulation target and the zeroth pulse train. The intensity ratio of the pulse trains is 1:1:$N_{NOT}$. It is noted that $N_{NOT}$ is the number of NOT circuits 25 as illustrated in FIGS. 6 to 8 in the optical logic circuit. The details of the NOT circuit 25 are described later. The optical logic circuit according to the present embodiment includes 14n NOT circuits 25 as described later. Therefore, $N_{NOT}$ is 14n in the present embodiment.

The connection units of the optical demultiplexer are connected via optical transmission paths such as optical fibers with the optical modulator 65A, the optical modulator 65B and the output port 68 to which the continuous pulse train as the first modulation target, the continuous pulse train as the second modulation target and the zeroth pulse train are output respectively.

The optical modulator 65A performs an on/off modulation to the continuous pulse train as the first modulation target to obtain an optical signal representing data A (n-bit data A). And the optical modulator 65B performs an on/off modulation to the continuous pulse train as the second modulation target to obtain an optical signal representing data B (n-bit data B). It is noted that the phrase "perform an on/off modulation to a pulse train to obtain an optical signal representing data X" means that "an pulse train is modulated so that, as for data X, the intensity of each optical pulse corresponding to a bit the value of which is zero becomes almost zero and the intensity of each optical pulse corresponding to a bit the value of which is not zero does not change". The modulation of a pulse train as a modulation target is performed by each optical modulator 65 (65A and 65B) at intervals of time T starting from the first bit (the least significant bit) of data X.

As illustrated in FIG. 2, signals output from the optical modulator 65A and the optical modulator 65B are input into the output port 68A and the output port 68B, respectively. Therefore, the output port 68A and the output port 68B output an optical signal representing data A and an optical signal representing data B, respectively.

The configuration of the first optical signal generation apparatus is described above. And the first optical signal generation apparatus is generally designed and manufactured so as to satisfy the following conditions 1 and 2.

Condition 1: The optical path length (or optical distance) of the optical signal path between the generation source 61 and the output port 68A, the optical path length of the optical signal path between the generation source 61 and the output port 68B and the optical path length of the optical signal path between the generation source 61 and output port 68C are the same.

Condition 2: The optical path length of the optical signal path between the generation source 61 and the optical modulator 65A and the optical path length of the optical signal path between the generation source 61 and the optical modulator 65B are the same.

The reasons why the first optical signal generation apparatus is needed to be manufactured to satisfy Conditions 1 and 2 as above are described below.

In the following descriptions, a data pulse train D[X] or merely D[X] (X=A, B etc.) means an optical signal representing data X. In addition, Is means the intensity which corresponds to ("same as" if transmission loss etc. is ignored) the intensity of each optical pulse in the pulse trains as the first and the second modulation target. Moreover, an OFF pulse means an optical pulse of which the intensity is almost zero, an ON pulse means an optical pulse of which the intensity is almost Is and a data pulse means an OFF pulse or ON pulse. The kth pulse (k=1 to n) of D[X] means a data pulse representing the value of the kth bit of data X. The phrase "a plurality of optical pulses are simultaneously input" means "a plurality of optical pulses are input with the input timing with which the phase differences of the optical pulses are equal to or smaller than the value such as π/20 radian defined based on the size of the optical logic circuit".

The optical logic circuit according to the present embodiment is configured as a circuit into which optical signals satisfying the following conditions are input when the add operations of data A and B are performed.

Condition i: the first to the nth pulses of D[A] is input into the input port 30A at intervals of period T in order starting from the first pulse. T is a pulse period of the zeroth pulse train, the pulse train as the first modulation target and the pulse train as the second modulation target.

Condition ii: certain optical pulses in the kth pulse (k=1 to n) and the zeroth pulse of D[B] are input into the input port 30B and the input port 30C, respectively, at the same time as the kth pulse of D[A] is input into the input port 30A.

Condition iii: the optical pulses in the optical pulse group which is input into the optical logic circuit while the first to the nth pulses of D[A] are input into the input port 30A are coherent to each other.

A variety of apparatuses providing optical signals which satisfy Condition i to iii as above for the optical logic circuit can be configured. However, as long as Condition i is satisfied, a first optical signal generation apparatus providing the following three different optical pulses (1) to (3) almost simultaneously at time T for the optical logic circuit can be configured.

(1) optical pulse indicating the result of the ON/OFF modulation of the optical modulator 65A for an optical pulse P1 which the optical demultiplexer 62 uses the optical pulse P0 output at a certain time from the generation source 61 to generate as an element of the pulse train as the first modulation target.
(2) optical pulse indicating the result of the ON/OFF modulation of the optical modulator 65B for an optical pulse P2 which the optical demultiplexer 62 uses the optical pulse P0 to generate as an element of the pulse train as the second modulation target.
(3) optical pulse P3 which the optical demultiplexer 62 uses the optical pulse P0 to generate as an element of the zeroth continuous pulse train.

Namely, when the first optical signal generation apparatus is configured to satisfy Condition i as above, the three different optical pulses (1) to (3) which satisfy Conditions i to iii and are preferably coherent to each other can be provided for the optical logic circuit.

In addition, when the first optical signal generation apparatus is configured to satisfy Condition ii as above, an control apparatus of the optical modulator 65A and the optical modulator 65B can be preferably achieved to simultaneously initiate the control of the optical modulator 65A and the control of the optical modulator 65B.

Therefore, the first optical generation apparatus is generally configured to satisfy Conditions i and ii as above.

Further, when the first optical generation apparatus as described above is used, the following three optical pulses can be coherent to each other.

(α) optical pulse indicating the result of the ON/OFF modulation of the optical modulator 65A for an optical pulse which the optical demultiplexer 62 uses the optical pulse P0 output at a certain time from the generation source 61 to generate as an element of the pulse train as the first modulation target.
(β) optical pulse indicating the result of the ON/OFF modulation of the optical modulator 65B for an optical pulse which the optical demultiplexer 62 uses the optical pulse for which the output time difference between the optical pulse and the optical pulse P0 is not large (for example, several T or dozen T) to generate as an element of the pulse train as the second modulation target.
(γ) optical pulse which the optical demultiplexer 62 uses the optical pulse for which the output time difference between the optical pulse and the optical pulse P0 is not large to generate as an element of the third continuous pulse train.

Moreover, even when Condition ii as above is not satisfied, the control timings of the optical modulators 65A and 65B can be modified to simultaneously input the optical pulses (1) and (2) as described above or (α) and (β) as described above into the optical logic circuit.

Therefore, when the optical logic circuit is used to perform add operations of data A and B, Condition i and/or Condition ii may not be satisfied in the first optical signal generation apparatus.

Next, descriptions are given to an apparatus connected to the output port 32 of the optical logic circuit when the optical logic circuit performs add operations of data A and B.

Figure 3:
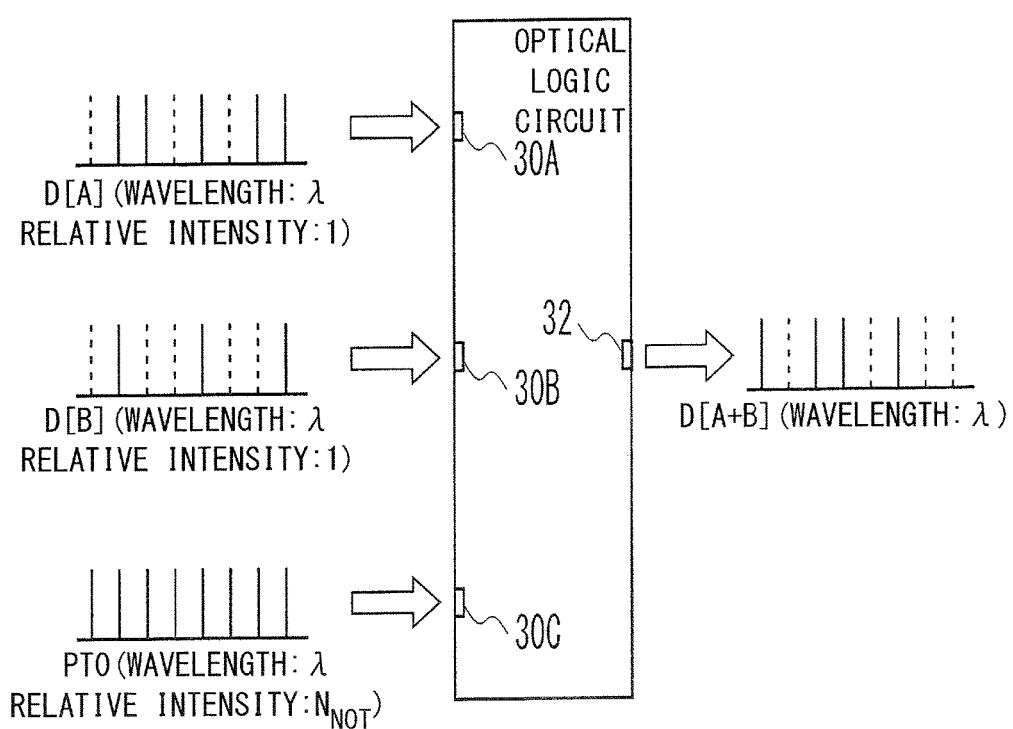
FIG. 3 is a diagram illustrating optical signals input into and output from an optical logic circuit according to the first embodiment.

As illustrated in FIG. 3, the output port 32 outputs a data pulse train D[A+B] representing "A+B" when D[A], D[B] and the zeroth pulse train (hereinafter referred to as PT0) are input into the optical logic circuit. It is noted that the details of the processes performed by the optical logic circuit are described later. FIG. 3 illustrates each waveform of the ON data pulse as a solid line and each waveform of the OFF data pulse as a dotted line. In addition, eave waveform which is input or output at an earlier time is depicted to the right of a waveform which is input or output at a later time.

Therefore, when the optical logic circuit performs add operations of data A and B, a photoelectric conversion apparatus which can convert data pulse trains, which are continuous pulse trains to which ON/OFF modulations have been applied), into digital data is connected to the output port 32 of the optical logic circuit. For example, the photoelectric conversion apparatus is an apparatus which uses a photodiode to measure the intensity (such as Is/2) of each optical pulse output from the output port 32 and compare the intensity with a threshold to convert the data pulse trains into n-bit data, which is generally parallel data.

Next, a method of using the optical logic circuit to simultaneously perform add operations of m pairs of data Ak and Bk (k=1 to m) is described below.

Figure 4:
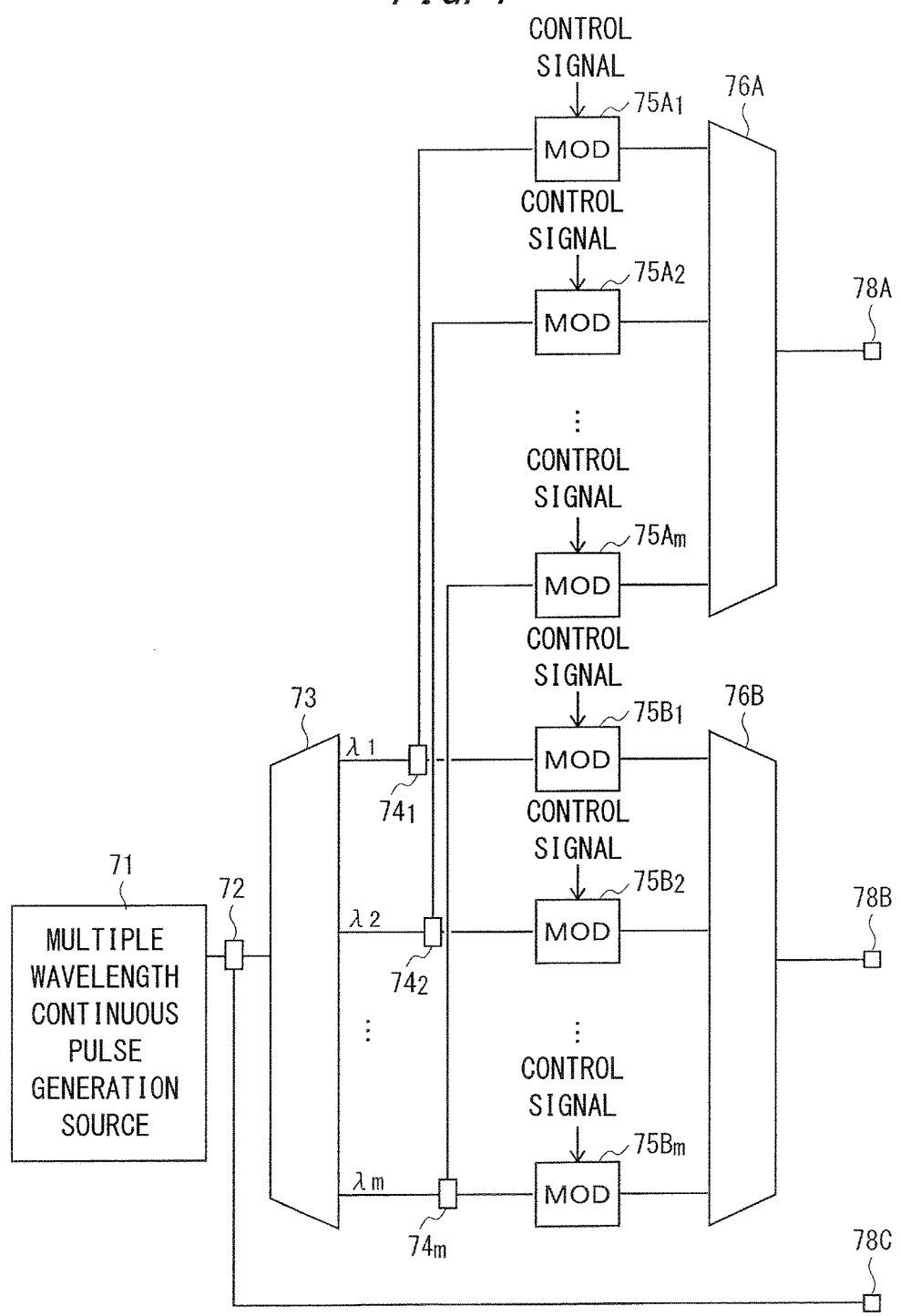
FIG. 4 is a configuration diagram schematically illustrating the second signal generation apparatus for providing optical signals for an optical logic circuit.

When the optical logic circuit is used to simultaneously perform add operations of m pairs of data Ak and Bk (k=1 to m), the second optical signal generation apparatus which employs a configuration as illustrated in FIG. 4 is connected with the input ports 30A to 30C of the optical logic circuit.

The output ports 78A to 78C of the second signal generation apparatus are connected with the input ports 30A to 30C of the optical logic circuit. As illustrated in FIG. 4, the second signal generation apparatus includes a multiple wavelength continuous pulse generation source 71, an optical demultiplexer 72, a WDM (Wavelength Division Multiplexing) optical demultiplexer 73 and optical demultiplexers $74_1$ to $74_m$ in addition to the output ports 78A to 78C. Further, the second optical signal generation apparatus also includes optical modulators $75A_1$ to $75A_m$, optical modulators $75B_1$ to $75B_m$ and optical multiplexers 76A and 76B.

The multiple wavelength continuous pulse generation source 71 is a unit configured to simultaneously generate and output m continuous pulse trains with pulse period T and the wavelengths of which are different from one another. A pulse source which outputs the m continuous pulse trains the intensities of which are not widely different from each other at the same timing is employed as the multiple wavelength continuous pulse generation source 71. In the following descriptions, the wavelengths of the m continuous pulse trains output from the multiple wavelength continuous pulse generation source 71 are referred to as λ1 to λm. In addition, the multiple wavelength continuous pulse generation source 71 is referred to as the generation source 71 and an optical signal such as the optical signal output from the generation source 71 in which m pulse trains are superposed is referred to as a composite pulse train.

The optical demultiplexer 72 is an apparatus configured to divide a composite pulse train output from the generation source 71 into two composite pulse trains of which the intensity ratio is $1:N_{NOT}$.

The composite pulse train of which the intensity ratio is $N_{NOT}$ output from the optical demultiplexer 72 is provided for the output port 78C via the optical transmission path such as optical fiber. On the other hand, the composite pulse train of which the intensity of the above intensity ratio is 1 output from the optical demultiplexer 72 is provided for the WDM optical demultiplexer 73 via the optical transmission path such as optical fiber.

The WDM optical demultiplexer 73 is an optical demultiplexer configured to divide a composite pulse train provided by the optical demultiplexer 72 into m continuous pulse trains with wavelengths $\lambda 1$ to $\lambda m$. The continuous pulse train with wavelength $\lambda k$ (k=1 to m) demultiplexed by the WDM optical demultiplexer 73 is provided for the optical demultiplexer 74$_k$. Then, the continuous pulse train with wavelength $\lambda k$ is divided into the pulse train as the first modulation target and the pulse train as the second modulation target the intensities of which are almost the same. And the pulse train as the first modulation target and the pulse train as the second modulation target are provided for the optical modulators 75A$_k$ and 75B$_k$, respectively.

The optical modulator 75A$_k$ (k=1 to m) is an apparatus configured to perform an ON/OFF modulation to the pulse train as the first modulation target with wavelength $\lambda k$ to obtain an optical signal representing data Ak. The pulse train as the first modulation target with wavelength $\lambda k$ is modulated into D[Ak], which is a data pulse train representing data Ak, by the optical modulator 75A$_k$ and provided for the optical multiplexer 76A.

The optical modulator 75B$_k$ (k=1 to m) is an apparatus configured to perform an ON/OFF modulation to the pulse train as the second modulation target with wavelength $\lambda k$ to obtain an optical signal representing data Bk. The pulse train as the second modulation target with wavelength $\lambda k$ is modulated into D[Bk], which is a data pulse train representing data Bk, by the optical modulator 75B$_k$ and provided for the optical multiplexer 76B.

The optical multiplexer 76A is an apparatus configured to multiplex data pulse trains D[A1] to D[Am] output from the optical modulator 75A$_1$ to 75A$_m$ and provide the result of multiplexing (i.e. composite pulse train in which data pulse trains D[A1] to D[Am] are superposed) for the output port 78A. The optical multiplexer 76B is an apparatus configured to multiplex data pulse trains D[B1] to D[Bm] output from the optical modulator 75B$_1$ to 75B$_m$ and provide the result of multiplexing for the output port 78B.

In addition, the second optical signal generation apparatus is generally configured to satisfy the following Conditions 3 and 4.

Condition 3: the optical path lengths of the optical signal transmission paths via optical modulators 75A between the generation source 71 and the output port 78A, the optical path lengths of the optical signal transmission paths via optical modulators 75B between the generation source 71 and the output port 78B and the optical path lengths between the generation source 71 and the output port 78C are the same.

Condition 4: the optical path lengths of the optical signal transmission paths between the generation source 71 and the optical modulators 75A and the optical path lengths of the optical signal transmission paths between the generation source 71 and the optical modulators 75B are the same.

The reasons why the second optical signal generation apparatus is configured to satisfy Conditions 3 and 4 are similar to the reasons why the first optical signal generation apparatus is configured to satisfy Conditions 1 and 2. Therefore, the detailed descriptions of the reasons are omitted here.

Figure 5:
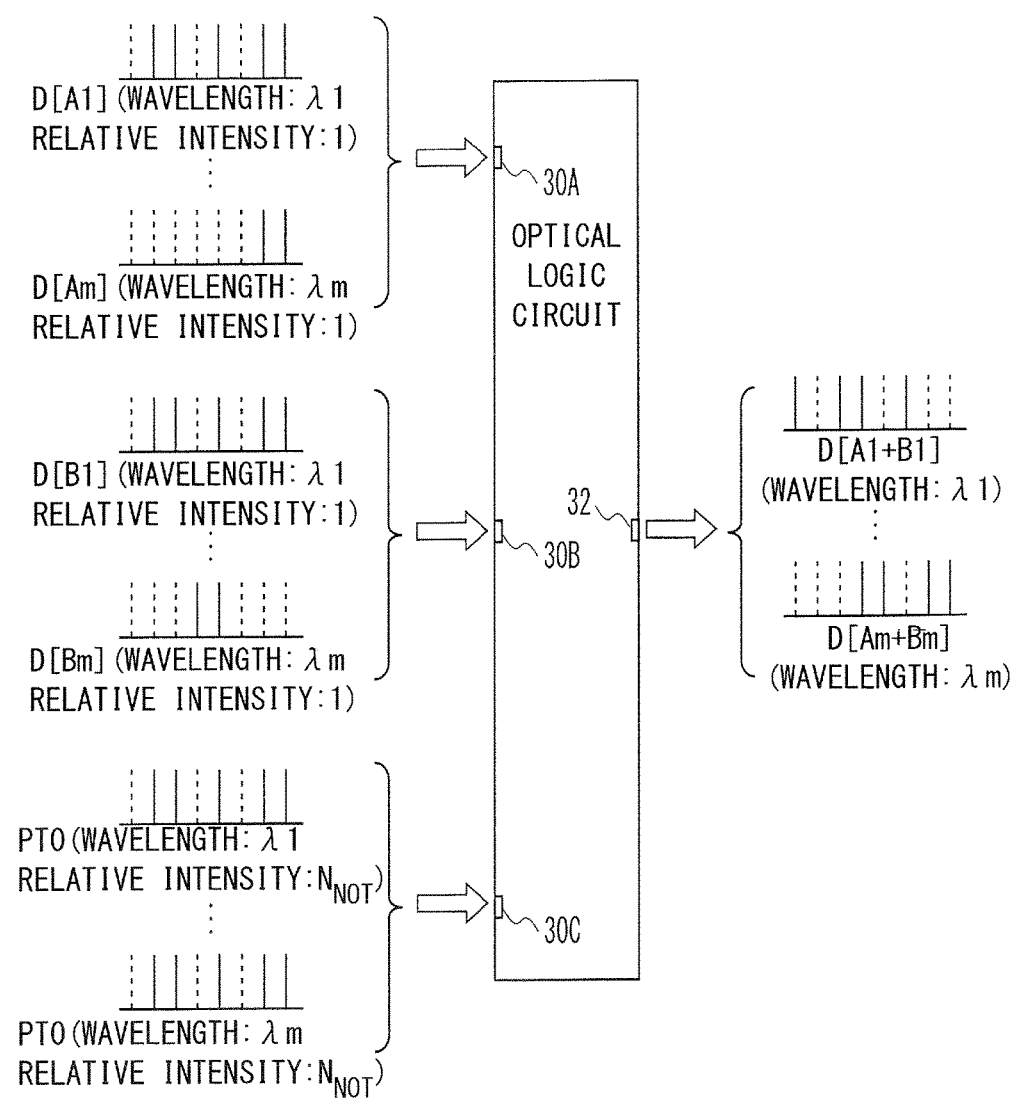
FIG. 5 is a diagram illustrating optical signals input into and output from an optical logic circuit according to the first embodiment.

As the configurations of the second optical signal generation apparatus are described above, the optical signals as typically illustrated in FIG. 5 are input into the input ports 30A to 30C of the optical logic circuit when the simultaneous add operations of m pairs of data Ak and Bk (k=1 to m) are performed by the optical logic circuit.

Namely, the composite pulse train in which D[A1] to D[Am] are superposed is input into the input port 30A. In addition, the composite pulse train in which D[B1] to D[Bm] are superposed is input into the input port 30B at the same moment at which the input time of the first pulse of D[B1] to D[Bm] and the input time of the first pulse of D[A1] to D[Am] match with each other. Further, the composite pulse train in which m zeroth pulse trains PT0 with different wavelengths are superposed is input into the input port 30C at the same moment at which the input time of a particular optical pulse and the input time of the first pulse of each data pulse train match with each other.

Next, descriptions are provided below for an apparatus connected with the output port 32 of the optical logic circuit when the optical logic circuit performs simultaneous add operations of m pairs of data Ak and Bk (k=1 to m).

When the optical logic circuit performs simultaneous add operations of m pairs of data Ak and Bk, the output port 32 of the optical logic circuit outputs optical signals (composite pulse trains) in which m pieces of data d[A1+B1] to D[Am+Bm] with different wavelengths as illustrated in FIG. 5.

Therefore, in this case, the output port 32 is connected with an apparatus which includes a WDM optical demultiplexer for demultiplexing the optical signals output from the output port 32 into m data pulse trains with wavelengths $\lambda 1$ to $\lambda m$ and m photoelectric conversion apparatuses for converting the m data pulse trains into digital data. It is noted that an example of the photoelectric conversion apparatus can be an apparatus which uses a PD to compare the intensity of each optical pulse with a threshold and convert the data pulse trains into n-bit parallel data, for example.

The configuration and function of the optical logic circuit according to the first embodiment is described with reference to FIG. 1. In the following descriptions, a connection unit such as a connection unit 11 and a connection unit 21-1 represents a design boundary for a variety of elements of the optical logic circuit such as a selector 10, an XOR circuit 22 and an AND circuit 23. Therefore, the connection unit includes a part which is not manufactured for connecting other parts. The part exemplifies a part which is manufactured as a portion of an optical transmission path such as a waveguide.

As illustrated in FIG. 1, the input port 30A and the input port 30B of the optical logic circuit are connected with a connection unit 11 of the optical selector 10A and a connection unit 11 of the optical selector 10B, respectively.

The optical selector 10A includes the connection unit 11 and the connection units 12$_1$ to 12$_n$. The optical selector 10A uses electric control signals (not illustrated) to specify the output (any one of the connection units 12$_1$ to 12$_n$) of the optical signals input into the connection unit 11. Each connection unit 12$_k$ (k=1 to n) of the optical selector 10A is connected with an adder 20$_k$ via an optical transmission path the optical length of which allows the optical pulse (data pulse) input into the connection unit 11 to reach the connection unit 21-1 of the adder 20$_k$ at a certain time t0.

Similarly, the optical selector 10B includes the connection unit 11 and the connection units 12$_1$ to 12$_n$. The optical selector 10B uses electric control signals to specify the output of the optical signals input into the connection unit 11. Each connection unit 12$_k$ (k=1 to n) of the optical selector 10B is connected with an adder 20$_k$ via an optical transmission path the optical length of which allows the optical pulse (data pulse) input into the connection unit 11 to reach the connection unit 21-2 of the adder 20$_k$ at the time t0.

As described above, when the optical logic circuit performs the add operations of the data A and B, D[A] and D[B] are input into the input port 30A and the input port 30B, respectively.

When the optical logic circuit performs the add operations of the data A and B, the optical selector 10A is controlled to output the kth (k=1 to n) pulse of D[A] from the connection unit 12$_k$ and the optical selector 10B is controlled to output the kth pulse of D[B] from the connection unit 12$_k$. It is noted that when the optical selectors 10 (10A and 10B) are controlled as above, the optical selectors 10 are normally instructed to switch the output of the input light to the subsequent output destination with each time T.

On the other hand, when the optical logic circuit performs the simultaneous add operations of m pairs of n-bit data, the optical selector 10A is controlled to output m pieces of the kth (k=1 to n) pulses of D[A1] to D[Am] from the connection unit 12$_k$ and the optical selector 10B is controlled to output m pieces of the kth pulses of D[B1] to D[Bm] from the connection unit 12$_k$.

However, the m pieces of the kth pulses of D[A1] to D[Am] are input into the input port 30A as an optical signal, hereinafter referred to as composite pulse, in which the pulses are superposed on one another as illustrated in FIG. 5. In addition, the m pieces of the kth pulses of D[B1] to D[Bm] are input into the input port 30B as a composite pulse in which the pulses are superposed on one another. Therefore, each optical selector 10 is controlled in the same manner when the optical logic circuit performs either the add operation of one pair of data A and B or the simultaneous add operations of m pairs of n-bit data.

The optical logic circuit as illustrated in FIG. 1 includes a plurality of optical demultiplexers (not illustrated) for demultiplexing the zeroth pulse train PT0 independently input into the input port 30C or m pieces of the zeroth pulse trains PT0 which are superposed on one another into the input port 30C into $N_{NOT}$ pieces of optical signals with a similar intensity.

In the following descriptions, each optical signal which is obtained by demultiplexing one piece of the zeroth pulse train PT0 independently input into the input port 30C into $N_{NOT}$ pieces of optical signals with the similar intensity is referred to as a standard pulse train PT. In addition, each optical signal which is obtained by demultiplexing m pieces of the zeroth pulse trains PT0 which are superposed on one another input into the input port 30C into $N_{NOT}$ pieces of optical signals with the similar intensity is referred to as a composite standard pulse train PT. Further, a continuous pulse train with each wavelength included in the composite standard pulse train PT is also referred to as a standard pulse train PT.

Further, a composite pulse train in which D[X1] to D[Xm] are superposed on one another is referred to as a composite data pulse train. It is noted that the intensity of the zeroth pulse train with a certain wavelength is $N_{NOT}$ times as much as the intensity of a data pulse train with the same wavelength. Therefore, the standard pulse train PT is a pulse train in which the intensity of each optical pulse is almost 1s.

As clearly illustrated by the circuit configuration in FIG. 1, the adder 20$_k$ (k=1 to n) fundamentally corresponds to an circuit in which an XOR gate, an AND gate and an OR gate of an full adder employed in an electronic circuit are replaced with the XOR circuit 22, the AND circuit 23 and the OR circuit 24, respectively.

FIGS. 6 and 7 illustrate the AND circuit 23 and the XOR circuit 22, respectively.

As illustrated in FIGS. 6 and 7, the AND circuit 23 in FIG. 6 and the XOR circuit 22 in FIG. 7 are circuits in which the NOT circuit 25 including a circuit 25$_1$ etc. and the OR circuit 24 including a circuit 24$_1$ etc. are combined with each other.

Therefore, the configurations and functions of the NOT circuit 25 and the OR circuit 24 are described before the details of the XOR circuit 22 and the AND circuit 23 are described.

FIG. 8 illustrates the configuration of the NOT circuit 25. As illustrated in FIG. 8, the NOT circuit 25 includes three connection units 25*a*-1 to 25*a*-3 and a mirror 25*b*, an optical multiplexer 25*c* and optical transmission paths 25*d*-1 and 25*d*-2.

The connection units 25*a*-1 and 25*a*-2 are parts into which data pulse trains or composite data pulse trains, or standard pulse trains PT or composite standard pulse trains PT are input. As described above, a composite data pulse train is an optical signal in which D[X1] to D[Xm] are superposed on one another. In addition, a composite standard pulse train PT is an optical signal in which m pieces of the zeroth pulse trains with different wavelengths are superposed on one another.

The mirror 25*b* is a part for reflecting the light input from the connection unit 25*a*-1 by fixed end reflection to output the light to the optical multiplexer 25*c*. Namely, when a data pulse train with a certain wavelength is independently input into the mirror 25*b* from the connection unit 25*a*-2, the mirror 25*b* outputs to the optical multiplexer 25*c* a data pulse train in which the phase of each data pulse differs from the input data pulse by π radian. In addition, when a composite data pulse train is input into the mirror 25*b* from the connection unit 25*a*-2, the mirror 25*b* outputs to the optical multiplexer 25*c* a data pulse train in which the phase of each data pulse included in the composite data pulse train differs from the input data pulse by π radian. It is noted that the mirror 25*b* can be achieved by a metal film, for example.

The optical transmission path 25*d*-1 is an optical transmission path for providing optical signals (data pulse trains or composite data pulse trains) input into the connection unit 25*a*-1 for the mirror 25*b* and for providing the light reflected from the mirror 25*b* for the optical multiplexer 25*c*. The optical transmission path 25*d*-1 can be achieved by using a slab waveguide on the side of which the mirror 25*b* is provided, a waveguide for connecting the slab waveguide and the connection unit 25*a*-1 and a waveguide for connecting the slab waveguide and the connection unit 25*a*-2.

The optical transmission path 25*d*-2 is an optical transmission path for providing standard pulse trains PT or composite standard pulse trains PT input into the connection unit 25*a*-2 for the optical multiplexer 25*c*. The shape and material of the optical transmission path 25*d*-2 are determined in order to conform the optical path length thereof with the optical path length of the optical transmission path 25*d*-1.

The optical multiplexer 25*c* is an apparatus configured to multiplex two optical signals input into the optical multiplexer 25*c*. A Y-shaped waveguide exemplifies the optical multiplexer 25*c*. The signals output from the optical multiplexer 25*c* is provided for the connection unit 25*a*-3 of the NOT circuit 25 via the optical transmission path.

Next, the functions of the NOT circuit 25 are described below. It is noted that a standard pulse means an optical pulse contained in a standard pulse train PT.

It is assumed in the following descriptions that a data pulse and a standard pulse with the same wavelength are simultaneously input into the NOT circuit 25.

In this case, the data pulse input into the connection unit 25a-1 is subject to π radian shift at the mirror 25b and is provided for the optical multiplexer 25c. In addition, the standard pulse input into connection unit 25a-1 in concurrence with the data pulse is not subject to the phase shift and is provided for the optical multiplexer 25c.

The optical path lengths of the optical transmission path 25d-1 and the optical transmission path 25d-2 are the same and the intensity of the standard pulse is equal to the intensity of the ON pulse. Therefore, when a data pulse input into the connection unit 25a-1 is an ON pulse, the optical pulse in which the phase of the ON pulse has been subject to the π radian shift and the standard pulse cancel each other out due to interference. As a result, the optical multiplexer 25c outputs an optical pulse the intensity of which is almost zero, that is, an OFF pulse.

In addition, when a data pulse input into the connection unit 25a-1 is an OFF pulse, the result of multiplexing of the standard pulse and the optical pulse in which the phase of the OFF pulse has been subject to the π radian shift is output. Since the intensity of the OFF pulse is almost zero, the optical multiplexer 25c outputs an optical pulse the intensity of which is almost Is, that is, an ON pulse.

As described above, when a certain data pulse is input into the NOT circuit 25, the NOT circuit 25 outputs a data pulse in which the ON/OFF of the input data pulse is inverted. And when a data pulse train and a standard data pulse train with the same wavelength are input into the NOT circuit 25 at almost the same moment, the NOT circuit 25 inverts each data pulse included in the data pulse train and outputs the inverted data pulse. Therefore, the NOT circuit 25 is a circuit which outputs data pulse trains in which the ON/OFF of each data pulse of the input data pulse trains is inverted. It is noted that the resultant data pulse train is referred to as the result of the NOT operation of the input data pulse train.

Further, the NOT circuit 25 is a circuit which employs the fixed end reflection and the superposition to invert the ON/OFF of each data pulse. The fixed end reflection and the superposition are little influenced by the existence of light with another wave length. Therefore, when a composite data pulse train and a composite standard pulse train are input into the NOT circuit 25, the processes for generating and outputting the result of the NOT operation of the input data pulse train can be performed for each wavelength with little influence on the optical signals with different wavelengths.

Next, the configuration and functions of the OR circuit 24 are described below.

Figure 9:
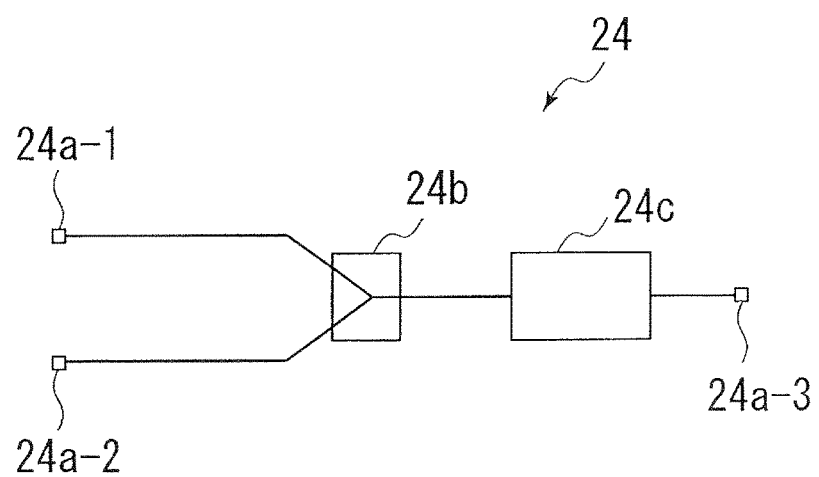
FIG. 9 is a configuration diagram schematically illustrating an OR circuit employed in an optical logic circuit according to the first embodiment.

FIG. 9 illustrates the configuration of the OR circuit 24. As illustrated in FIG. 9, the OR circuit 24 includes three connection units 24a-1 to 24a-3, an optical multiplexer 24b and an output level adjustment unit 24c.

The connection unit 24a-1 is a part into which one of two data pulse trains or two composite data pulse trains which are subject to an OR operation is input. The connection unit 24a-2 is a part into which the other of the two data pulse trains or the two composite data pulse trains is input.

The optical multiplexer 24b is an apparatus for multiplexing an optical signal input into the connection unit 24a-1 and an optical signal input into the connection unit 24a-2. A Y-shaped waveguide exemplifies the optical multiplexer 24b. The optical path length between the optical multiplexer 24c and the connection unit 24a-1 and the optical path length between the optical multiplexer 24c and the connection unit 24a-2 are the same.

The output level adjustment unit 24c is an apparatus for converting each optical pulse output from the optical multiplexer 24c which is not an OFF pulse into an ON pulse the intensity of which is almost Is and providing the converted optical pulse for the connection unit 24a-3.

As the details are described above, when a pair of data pulses is input into the OR circuit 24, the optical multiplexer 24b outputs an optical pulse the intensity of which is almost zero, that is, an OFF pulse or the intensity of which is almost Is or the intensity of which is almost 2Is. In addition, when m pairs of data pulses with different wavelengths are input into the OR circuit 24, the optical multiplexer 24b outputs optical pulses the intensity of which is almost zero, that is, an OFF pulse or the intensity of which is almost Is or the intensity of which is almost 2Is.

Therefore, the output level adjustment unit 24c of the OR circuit 24 can be any apparatus which converts each optical pulse of which the intensity ranges from Is to 2Is into an optical pulse the intensity of which is almost Is. For example, waveguide material such as optical fiber in which Stimulated Brillouin Scattering (SBS) occurs when an optical pulse the intensity of which is around is input thereinto can be used as the output level adjustment unit 24c.

The SBS scattering is a phenomenon regarding reflection of light with an intensity equal to or larger than a certain intensity and occurs for light with each wavelength. Namely, although the SBS scattering is a non-linear optical effect, the intensity of light with one wavelength does not affect the intensities of light with other wavelengths. Therefore, even when light in which light with multiple wavelengths multiplexed is input into an optical logic circuit using a waveguide material which induces the SBS scattering, the operations as described above can be performed for each wavelength.

Figure 10:
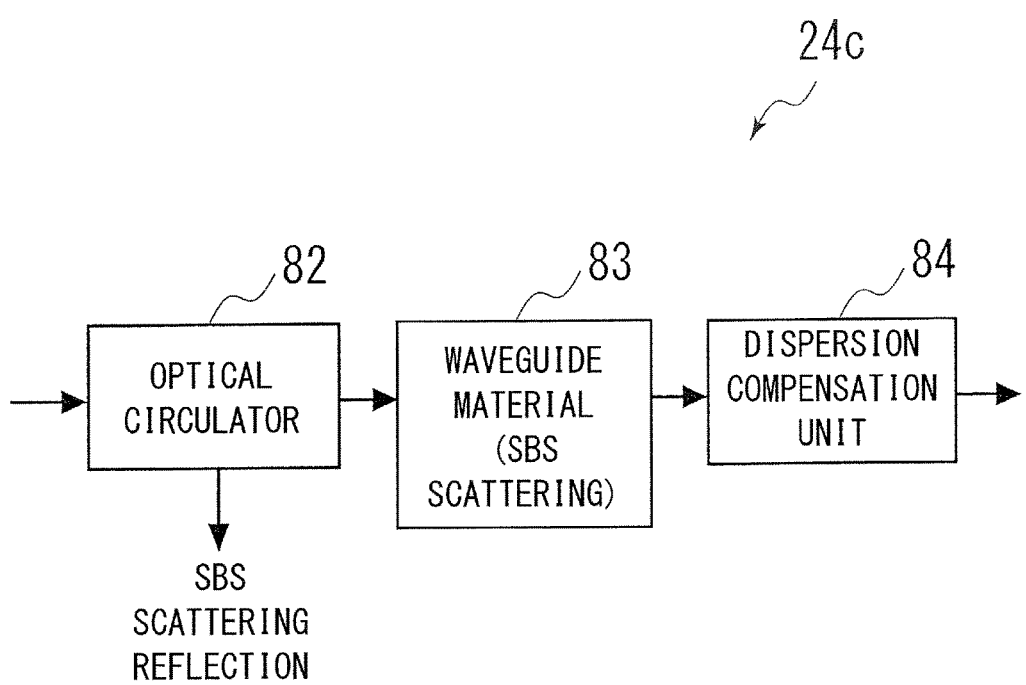
FIG. 10 is a configuration diagram schematically illustrating an example of an output level adjustment unit.

In addition, an apparatus with the configuration as illustrated in FIG. 10 can be used as the output level adjustment unit 24c, for example. Namely, an apparatus in which an optical circulator 82 for preventing light reflected due to the SBS scattering from going back to the input side and a dispersion compensation unit 84 such as a dispersion compensation fiber are provided before and after the waveguide material 83.

It is noted that when the apparatus with the configuration as illustrated in FIG. 10 or the waveguide material 83 is used as the output level adjustment unit 24c, the phase of an optical pulse generated from an optical pulse of which the intensity is Is and the phase of an optical pulse generated from an optical pulse of which the intensity is 2Is may be different from each other.

However, the optical logic circuit functions without a problem when the phase difference between the optical pulse generated from the optical pulse of which the intensity is Is and the optical pulse generated from the optical pulse of which the intensity is 2Is is the integral multiple of 2π. It is noted that the phase difference can be 2π by changing the intensity of the optical pulse provided for the optical logic circuit or by providing an optical pulse with a specific wavelength for the optical logic circuit.

Therefore, when the apparatus with the configuration as illustrated in FIG. 10 or the waveguide material 83 is used as the output level adjustment unit 24c, the circuit configuration of the optical logic circuit is not needed to be modified and the design of the optical signal generation apparatus is merely modified to set the phase difference as described above to be the integral multiple of 2π.

Next, the configurations and functions of the remaining units of the optical logic circuit according to the first embodiment are described.

An AND circuit 23 as illustrated in FIG. 6 is a circuit in which three NOT gates and an OR gate included in an AND gate are replaced with three NOT circuits $25_1$ to $25_3$ and an OR circuit $24_1$, respectively. The configurations of the NOT circuit $25_1$ to $25_3$ are similar to the configuration of the NOT circuit 25 as illustrated in FIG. 8. And the configuration of the OR circuit $24_1$ is similar to the configuration of the OR circuit 24 as illustrated in FIG. 9.

Namely, the AND circuit 23 includes a configuration as an AND circuit which performs AND operations of optical signals when each NOT circuit $25_L$ (L=1 to 3) functions as a NOT circuit and the OR circuit $24_1$ functions as an OR circuit. It is noted that an AND circuit which performs AND operations of optical signals is a circuit which outputs from the connection unit 23-3 a data pulse train or a composite data pulse train which indicates the result of the AND operation of two data pulse trains or a composite data pulse train input into the connection units 23-1 and 23-2.

Therefore, the AND circuit 23 is configured and manufactured to satisfy the following condition.

The condition is that the optical path length of the optical signal transmission path between the connection unit 23a-1 and the OR circuit $24_1$ via the NOT circuit $25_1$ and the optical path length of the optical signal transmission path between the connection unit 23a-2 and the OR circuit $24_1$ via the NOT circuit $25_2$ are the same. That is, the AND circuit 23 is configured and manufactured to achieve that when the input of a data pulse into the connection unit 23a-1 and the input of a data pulse into the connection unit 23a-2 occur at the same time the results of the operations of the data pulses performed by the NOT circuits $25_1$ and $25_2$ are input into the OR circuit $24_1$ at the same time.

In addition, the optical signal transmission path for providing standard signals PT for the NOT circuits $25_L$ (L=1 to 3) in the AND circuit 23 is configured and manufactured to allow the NOT circuits $25_L$ to invert the input data pulses. Namely, the optical signal transmission path for providing standard pulse trains PT or composite standard pulse trains PT for each NOT circuit $25_L$ is configured to provide the standard pulse for the connection unit 25a-2 at the same time when the data pulse is input into the connection unit 25a-1.

The XOR circuit 22 as illustrated in FIG. 7 is a circuit in which four NOT gates and three OR gates included in an XOR gate are replaced with four NOT circuits $25_4$ to $25_7$ and three OR circuit $24_2$ to $24_4$, respectively.

Each NOT circuit $25_L$ (L=4 to 7) in the XOR circuit 22 employs the similar configuration of the NOT circuit 25 as illustrated in FIG. 8. The OR circuit $24_M$ (M=2 to 4) employs the similar configuration of the OR circuit 24 as illustrated in FIG. 9.

That is, the XOR circuit 22 functions as a circuit which outputs from the connection unit 23-2 optical signals indicating the results of the XOR operations of two optical signals input into the connection units 23-1 and 23-2 when each element as described above functions as a NOT circuit or an OR circuit.

Further, it is desirable to provide data pulse trains or composite data pulse trains each ON pulse of which has the intensity Is for each NOT circuit 25L and each OR circuit 24M when each element in the XOR circuit 22 is configured to function as a NOT circuit or an OR circuit. Therefore, the XOR circuit 22 includes an optical amplifier 27 for providing for the OR circuit $24_2$ and the NOT circuit $25_4$ optical signals the intensities of which are similar to the intensities of the optical signals input into the connection unit 22a-1. It is noted that the amplification factor of the optical amplifier 27 is almost 2. Additionally, the XOR circuit 22 also includes an optical amplifier 27 for providing for the OR circuit $24_3$ and the NOT circuit $25_4$ optical signals the intensities of which are similar to the intensities of the optical signals input into the connection unit 22a-2.

Moreover, the XOR circuit 22 is configured and manufactured to satisfy the following conditions in order to allow each OR circuit $24_M$ (M=2 to 4) to function as an OR circuit.

The optical path length of the optical signal transmission path between the connection unit 22a-1 and the OR circuit $24_3$ via the NOT circuit $25_5$ etc. and the optical path length between the connection unit 22a-1 and the OR circuit $24_2$ are similar to each other.

The optical path length of the optical signal transmission path between the connection unit 22a-2 and the OR circuit $24_2$ via the NOT circuit $25_4$ etc. and the optical path length between the connection unit 22a-1 and the OR circuit $24_3$ are similar to each other.

The optical path length of the optical signal transmission path between the connection unit 22a-1 and the OR circuit $24_4$ via the NOT circuit $25_6$ etc. and the optical path length between the connection unit 22a-2 and the OR circuit $24_4$ via the NOT circuit $25_7$ etc. are similar to each other.

In addition, the optical signal transmission path for providing standard signals PT for each NOT circuit $25_L$ (L=4 to 7) is configured and manufactured to satisfy the following condition in order to allow each NOT circuit $25_L$ (L=4 to 7) in the XOR circuit 22.

A standard pulse with a certain wavelength is input into the connection unit 25a-2 of the NOT circuit $25_L$ at almost the same time when a data pulse with the certain wavelength is input into the connection unit 25a-1 of the NOT circuit $25_L$ (L=4 to 7).

It is noted that the configurations of the signal system for PT transmission including each NOT circuit 25 in each XOR circuit 22 and each AND circuit 23 to satisfy the conditions as described above can be achieved as follows.

First, the optical logic circuit is configured to be a circuit which includes the first layer which includes an optical transmission path and a variety of logical circuits such as the NOT circuit 25 for transmitting data pulses and the second layer which includes an optical demultiplexer and an optical transmission path for generating and transmitting PT. In addition, the first layer is configured to provide a unit to retrieve PT from the second layer near the connection unit 25a-2 of each NOT circuit 25. And then, the configurations such as the shape of the supply path of PT in the second layer are determined in order to achieve that each optical path length of the supply path of data pulse and PT in each NOT circuit 25.

Further, it may be desirable to configure the XOR circuit 22 and the AND circuit 23 as well as the OR circuit 24 and the NOT circuit 25 which is not included in the other logical circuit to take the same time for processing a data pulse, which is referred to as processing time. This is because the optical logic circuit can be more easily configured than a case in which the processing time for each circuit is not the same.

The following steps are carried out to achieve that the processing time for each circuit is the same.

Step 1. The NOT circuits $25_1$ to $25_7$ and the OR circuit $24_1$ to $24_4$ used as elements of the AND circuit 23 etc. are configured as circuits in which the processing time is shorter than the other circuits.

Step 2. The NOT circuits $25_4$ o $25_7$ and the OR circuits $24_2$ to $24_4$ are combined to configure the XOR circuit 22.

Step 3. The AND circuit 23, the OR circuit 24 and the NOT circuit 25 are configured to achieve that the processing times of these circuits and the processing time of the configured XOR circuit 22 are the same.

Referring back to FIG. 1, the optical logic circuit is described below.

As described above, the adder $20_k$ (k=1 to n) is a circuit in which the AND gate, the XOR gate and the OR gate of a full adder are replaced with the XOR circuit 22, the AND circuit 23 and the OR circuit 24, respectively. However, the XOR circuit 22, the AND circuit 23 and the OR circuit 24 are circuits into which two data pulses or composite data pulses of which the intensity is Is are input at the same time. It is noted that the two data pulses or composite data pulses of which the intensity is Is are data pulses or composite data pulses in which the intensity of each ON pulse is almost equal to Is.

Additionally, even when an optical signal (data pulse train or composite data pulse train) is merely demultiplexed into two signals by an optical demultiplexer for providing the same signals for two logical circuits, data signals of which the intensity is Is cannot be provided for the two logical circuits. Therefore, an optical amplifier 27 for amplifying the intensities of input optical signals twice as much as the original optical signals is provided before the optical demultiplexer of the adder $20_k$. It is noted that the branch of the optical transmission path (a solid line connecting between a circuit and a connection unit) illustrated near each optical amplifier 27 in FIG. 1 corresponds to an optical demultiplexer. A Y-shaped waveguide exemplifies the optical demultiplexer. In addition, An optical fiber amplifier exemplifies the optical amplifier 27.

Moreover, the optical transmission paths connecting the units of the adders $20_k$ with each other are configured and manufactured to achieve that two data pulses with the same wavelength for the logical operations are input into the logical circuits at the same time. That is, the optical signal transmission path including the optical amplifier 27 between the input port 21-1 and the XOR circuit $22_1$ is configured and manufactured to achieve that the optical path length of the transmission path and the optical path length of the optical signal transmission path between the input port 21-3 and the AND circuit $23_1$ are the same. And the optical signal transmission path between the input port 21-2 and the OR circuit 24 via the AND circuit $23_2$ etc. is configured and manufactured to achieve that the optical path length of the transmission path and the optical path length of the optical signal transmission path between the input port 21-1 and the OR circuit 24 via the AND circuit $23_1$ etc. are the same.

In addition, the OR circuit 24 of each adder $20_k$ (k=1 to n) outputs a data pulse for indicating the necessity of carrying operation, which is referred to as carrying pulse, since each adder employs a circuit configuration which is essentially similar to the circuit configuration of a full adder. However, when an add operation is performed to a pair of data A and data B, the OR circuit 24 of the adder $20_k$ outputs a carrying pulse when time t1 which is determined according to the configuration of the adder $20_k$ passes after the kth pulses of D[A] and D[B] are input into the adder $20_k$. The k+1th pulses of D[A] and D[B] are input into the subsequent adder $20_{k+1}$ when time T passes after the kth pulses of D[A] and D[B] are input into the adder $20_k$.

Therefore, an optical delay circuit 26 for achieving a time T−t1 delay of a carrying pulse is provided for the optical signal transmission path between the OR circuit 24 of the adder $20_k$ (k=1 to n−1) and the input port 21-3 of the adder $20_{k+1}$. More properly, the optical delay circuit 26 for achieving that the time needed for a carrying pulse to pass through the optical signal transmission path becomes "T−t1" is provided for the optical signal transmission path between the OR circuit 24 of the adder $20_k$ and the input port 21-3 of the adder $20_{k+1}$. It is noted that an optical fiber the length of which corresponds to the delay time is used as the optical delay circuit 26.

It is also noted that the adder $20_1$ functions as a half adder since a signal is not input into the input port 21-3 of the adder $20_1$.

The optical multiplexer 29 into which the outputs from the adders $20_1$ to $20_n$ is an apparatus which includes n connection units for signal input and multiplexes the optical signals input from the connection units for signal input irrespective of the wavelength of each optical signal. The optical signals output from the optical multiplexer 29 are input into the output port 32 of the optical logic circuit.

The optical logic circuit according to the present embodiment employs the configurations as described above. And each optical selector 10X (X=A, B) is controlled to output the kth (k=1 to n) pulse of D[X] from the connection unit $12_k$ of the optical selector 10X when the add operation of data A and data B is performed by the optical logic circuit.

Therefore, the first pulses of D[A] and D[B] are initially input into the adder $20_1$ when the add operation of data A and data B is performed by the optical logic circuit. And the first pulse of D[A+B] is output from the adder $20_1$. And then, the second pulses of D[A] and D[B] are input into the adder $20_2$ and a carrying pulse for the pulse output from the adder $20_1$ is also input into the adder $20_2$. Therefore, the second pulse of D[A+B] is output from the adder $20_2$.

And then, the adder $20_3$ to $20_n$ outputs the third to the nth pulses of D[A+B] at the similar time, respectively. As a result, a data pulse train D[A+B] as illustrated in FIG. 3 is output from the output port 32 of the optical logic circuit.

Further, each logical circuit such as the XOR circuit 22 and the AND circuit 23 used for the optical logic circuit is a circuit which performs logical operations of the data pulses including the NOT operations of data pulse trains by superposing two optical signals or by using the fixed end reflection and superposing of two optical signals. It is noted that the fixed end reflection and superposing of two optical signals are not affected by the existence of optical signals with other wavelengths. Therefore, when the optical logic circuit performs the simultaneous add operation of m pairs of data $A_k$ and data $B_k$ (k=1 to m), each data pulse with a respective wavelength can be processed by each logical circuit without influence from the other data pulses. And a composite data pulse train as illustrated in FIG. 5 in which m pieces data D[A1+B1] to D[Am+Bm] are superposed with each other is output from the output port 32 of the optical logic circuit.

Second Embodiment

The configurations and functions of the optical logic circuit according to the second embodiment are described below mainly focusing on the differences between the first embodiment and the second embodiment.

The optical logic circuit according to the present embodiment, which is hereinafter referred to as the second optical logic circuit, employs an configuration which is almost the same as the configuration of the optical logic circuit according to the first embodiment, which is hereinafter referred to as the first optical logic circuit. However, the OR circuit 24 as illustrated in FIG. 11 is used as an element of the XOR circuit 22 and the adder 20 etc. in the second optical logic circuit, and the NOT circuit 25 as illustrated in FIG. 12 is used as an element of the XOR circuit 22.

First, the OR circuit 24 used in the second optical logic circuit, which is hereinafter referred to as the second OR circuit 24, is described.

Figure 11:
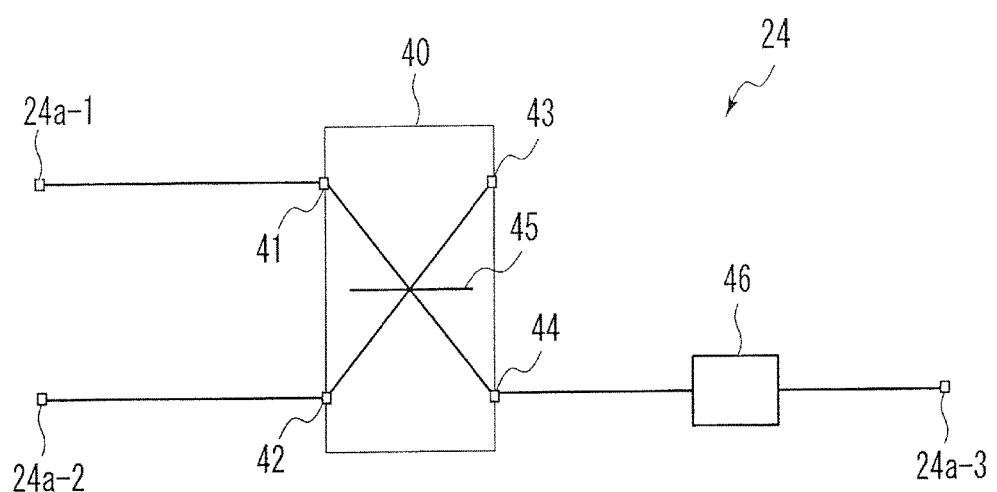
FIG. 11 is a configuration diagram schematically illustrating the second OR circuit.
Figure 12:
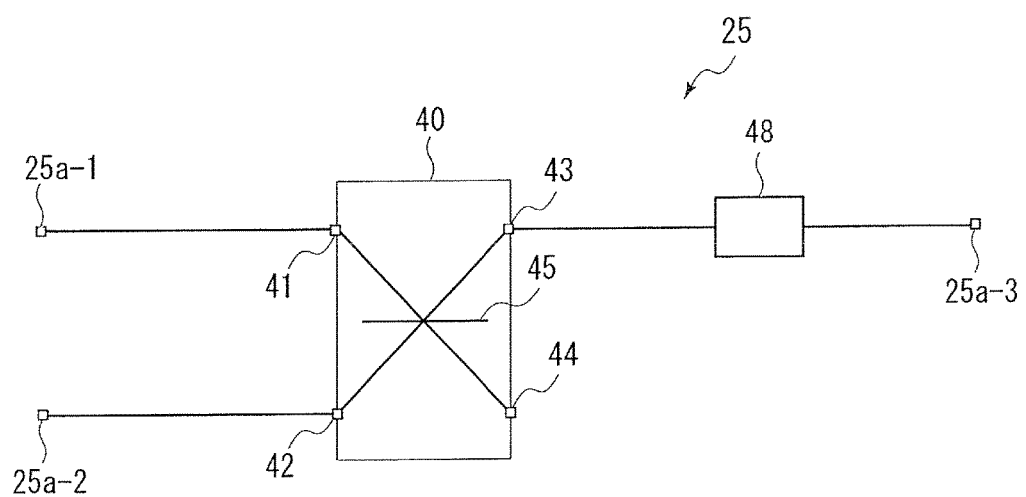
FIG. 12 is a configuration diagram schematically illustrating the second NOT circuit.

As illustrated in FIG. 11, the second OR circuit 24 includes three connection units 24a-1 to 24a-3, a half mirror unit 40 and an output level adjustment unit 46.

The connection units 24a-1 to 24a-3 are similar to the connection units 24a-1 to 24a-3 of the OR circuit 24 used in the optical logic circuit according to the first embodiment, which is referred to as the first OR circuit 24. That is, two optical signals (data pulse trains or composite data pulse trains) which are subject to an OR operation are input into the connection units 24a-1 and 24a-2 of the second OR circuit 24. In addition, the connection unit 24a-3 of the second OR circuit 24 outputs an optical signal representing the result of the OR operation of the two optical signals input into the connection units 24a-1 and 24a-3.

As illustrated in FIG. 11, the half mirror unit 40 includes a connection unit 41 connected with the connection unit 24a-1, a connection unit 42 connected with the connection unit 24a-2 and a connection unit 44 connected with the output level adjustment unit 46. The half mirror unit 40 also includes a connection unit 43 connected with a transmission path (not illustrated) for guiding light to the outside of the optical logic circuit and a half mirror 45.

Figure 13:
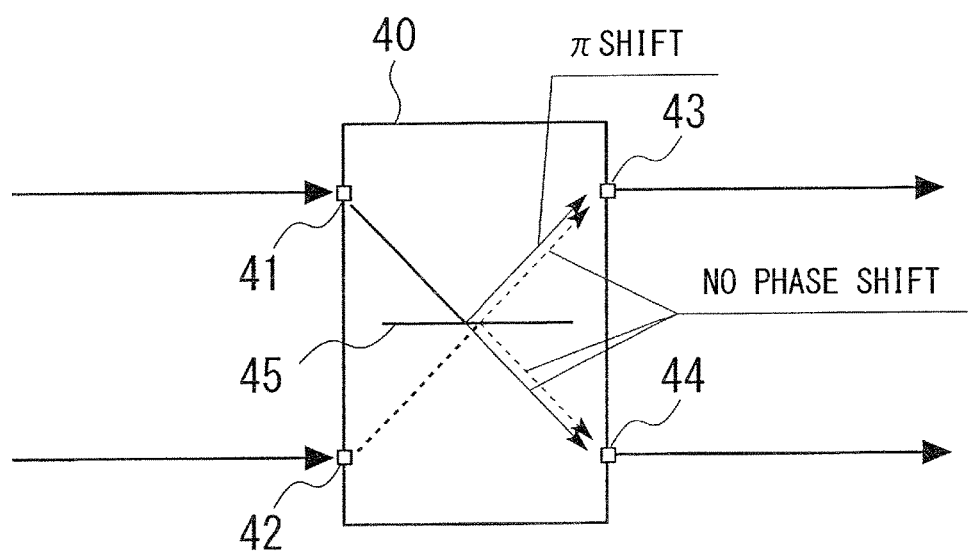
FIG. 13 is a diagram illustrating a half mirror unit.

The half mirror 45 is also referred to as asymmetric half mirror, for example. That is, the half mirror 45 branches the light (solid line) input from the connection unit 41 into reflected light the phase of which has been subject to a π radian shift as illustrated in FIG. 13 and transmitted light the phase of which has not been shifted. In addition, the half mirror 45 branches the light (dotted line) from the connection unit 42 into reflected light and transmitted light the phases of which have not been shifted and the intensities of which are similar to each other. It is noted that a metal film can be used as the half mirror 45.

Further, the relations among the units of the half mirror 40 as illustrated in FIG. 13 are configured to satisfy the following conditions.

When a pulse train Y and a pulse train Z are input into the connection units 41 and 42, reflected light of the pulse train Y and transmitted light of the pulse train Z are multiplexed and output from the connection unit 43. And transmitted light of the pulse train Y and reflected light of the pulse train Z are multiplexed and output from the connection unit 44.

As described above, the half mirror 40 includes functions as follows.

When an ON pulse with a wavelength is input into one of the connection units 41 and 42 of the half mirror unit 40 and an OFF pulse with the same wavelength is input into the other of the connection units 41 and 42 of the half mirror unit 40, an optical pulse the intensity of which is almost Is/2 is output from the connection unit 44. In addition, when an ON pulse with a wavelength is input into one of the connection units 41 and 42 of the half mirror unit 40 and an ON pulse with the same wavelength is input into the other of the connection units 41 and 42 of the half mirror unit 40, an optical pulse the intensity of which is almost Is is output from the connection unit 44. Further, when an OFF pulse with a wavelength is input into one of the connection units 41 and 42 of the half mirror unit 40 and an OFF pulse with the same wavelength is input into the other of the connection units 41 and 42 of the half mirror unit 40, an optical pulse the intensity of which is almost zero (that is, an OFF pulse) is output from the connection unit 44.

Figure 14:
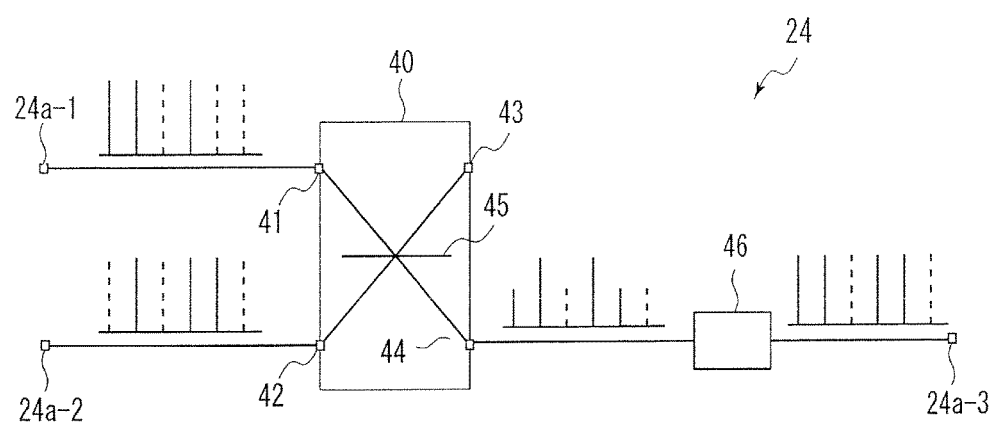
FIG. 14 is a diagram illustrating the second OR circuit.

In essence, an OFF pulse, an optical pulse the intensity of which is almost Is/2 or an optical pulse the intensity of which is almost Is is output from the connection unit 44 of the half mirror unit 40 according to the combination of the data pulses input into the connection units 24a-1 and 24a-2 as illustrated in FIG. 14.

When it is determined whether a pulse train output from the connection unit 44 is an ON pulse based on the determination of whether the intensity of the pulse is equal to or larger than a threshold such as 3Is/8, the pulse train output from the connection unit 44 can be used to represent the result of the OR operation of the two data pulse trains input into the connection units 24a-1 and 24a-2. Therefore, the signals output from the connection unit 44 can be used as the results of the OR operations and it is desirable to configure the second OR circuit 24 to output ON pulses the intensities of which are almost Is in consideration of the connections between the second OR circuit 24 and the other circuits.

The output level adjustment unit 46 is an apparatus included in the second OR circuit 24 for adjusting the intensity of each ON pulse output from the second OR circuit 24.

Figure 15:
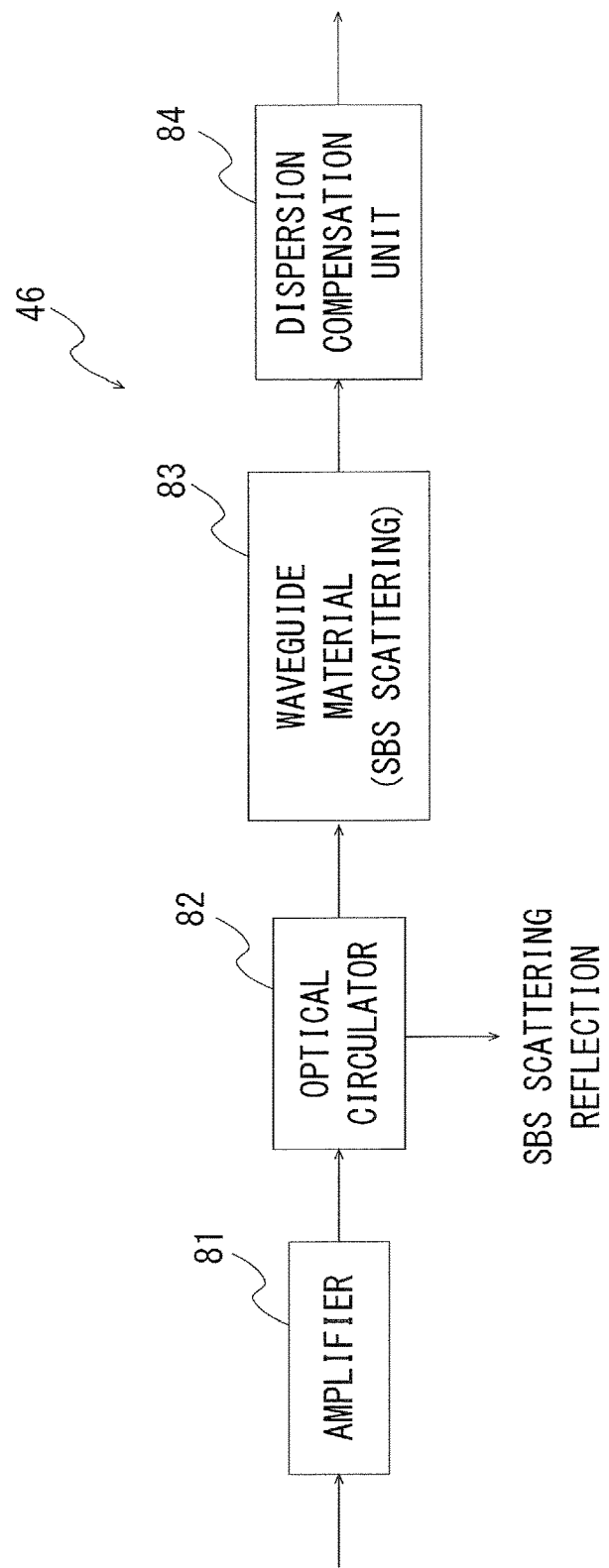
FIG. 15 is a configuration diagram schematically illustrating an example of an output level adjustment unit for the second OR circuit.

That is, an apparatus which converts optical pulses with a variety of wavelengths the intensities of which are from almost Is/2 to Is into optical pulses the intensities of which are almost Is is used as the output level adjustment unit 46. It is noted that an apparatus as illustrated in FIG. 15 can be used as the output level adjustment unit 46. That is, an apparatus which includes an optical amplifier 81 for amplifying the intensities of input optical signals almost twice as much as the original optical signals is provided before the output level adjustment unit 23c as illustrated in FIG. 10.

It is noted that when the apparatus as illustrated in FIG. 15 is used as the output level adjustment unit 46, the phase of the optical pulse generated from the optical pulse of which the intensity is Is and the phase of the optical pulse generated from the optical pulse of which the intensity is 2Is may differ from each other. However, the optical logic circuit functions without problems when the phase difference between the phase of the optical pulse generated from the optical pulse of which the intensity is Is and the phase of the optical pulse generated from the optical pulse of which the intensity is 2Is is the integral multiple of 2π. In addition, the phase difference can be the integral multiple of 2π by modifying the intensity of optical pulses provided for the optical logic circuit or by providing optical pulses with a specific wavelength for the optical logic circuit.

Therefore, the configuration of the optical logic circuit is not needed to be modified when the apparatus as illustrated in FIG. 15 is used as the output level adjustment unit 46. The specification of the optical signal generation apparatus has only to be modified to achieve that the phase difference is the integral multiple of 2π.

Next, the NOT circuit 25, which is referred to as the second NOT circuit 25 below, employed in the optical logic circuit according to the second embodiment is described below.

As illustrated in FIG. 12, the second NOT circuit 25 includes three connection units 25a-1 to 25a-3, a half mirror unit 40 and an output level adjustment unit 48.

The connection units 25a-1 to 25a-3 of the second NOT circuit 25 correspond to the connection units 25a-1 to 25a-3, respectively, of the NOT circuit 25 of the first optical logic circuit, which is referred to as the first NOT circuit 25 below. That is, data pulse trains or composite data pulse trains are input into the connection unit 25a-1 of the second NOT circuit 25 and standard pulse trains PT or composite standard pulse trains are input into the connection unit 25a-2 of the second NOT circuit 25. In addition, the connection unit 25a-3 of the second NOT circuit 25 outputs optical signals in which ON/OFF of each optical pulse of the optical signals (data pulse trains or composite data pulse trains) input into the connection unit 25a-1.

The half mirror unit 40 of the second NOT circuit 25 corresponds to the half mirror unit 40 of the second OR circuit 24. As illustrated in FIG. 12, the connection unit 43 of the half mirror unit 40 of the second NOT circuit 25 is connected with the connection unit 25a-3 via the output level adjustment unit 48. In addition, the connection unit 44 of the half mirror unit 40 of the second NOT circuit 25 is connected with a transmission path for guiding light to the outside of the optical logic circuit.

Namely, the half mirror 40 of the second NOT circuit 25 functions as described below.

First, it is assumed here that an ON pulse of which the intensity is almost Is is input into the optical logic circuit. In this case, a part of the ON pulse input into the connection unit 41 is reflected by the half mirror unit 45 with the phase shift of π radian. And the ON pulse is output as an optical pulse of which the intensity if almost Is/2 to the connection unit 43 side. It is noted that the output ON pulse is referred to as the second type ON pulse below.

Additionally, when the ON pulse is input into the connection unit 41, a standard pulse of which the wavelength is the same as the wavelength of the ON pulse is input into the connection unit 42. Therefore, a part of the standard pulse input into the connection unit 42 transmits through the half mirror 45 without a phase shift. The intensity of the transmitted standard pulse becomes Is/2. And the transmitted standard pulse, which is referred to as the second type standard pulse, is output to the connection unit 43 side.

The second type standard pulse and the second type ON pulse are optical pulses which annihilate each other when the pulses are superposed. Since the optical pulses are output to the connection unit 43 side, an Off pulse of which the intensity is almost zero is output from the connection unit 43 of the half mirror unit 40 when an ON pulse is input into the connection unit 41 of the half mirror unit 40.

In addition the intensity of the light of the OFF pulse reflected by the half mirror 45 is almost zero, when the OFF pulse is input into the connection unit 41. In this case, the second type standard pulse, which is an optical pulse of which the intensity is Is/2, is output from the connection unit 43 almost as it is.

As described above, the half mirror unit 40 converts the input ON pulse and the input OFF pulse into an OFF pulse and an optical pulse of which the intensity is almost Is/2.

Therefore, the output from the connection unit 43 of the half mirror unit 40 can be used as the result of the NOT operation. However, it is desirable in consideration of the connections between the second NOT circuit 25 and the other circuits to configure the second NOT circuit 25 to output ON pulses of which the intensity is almost Is.

Figure 16:
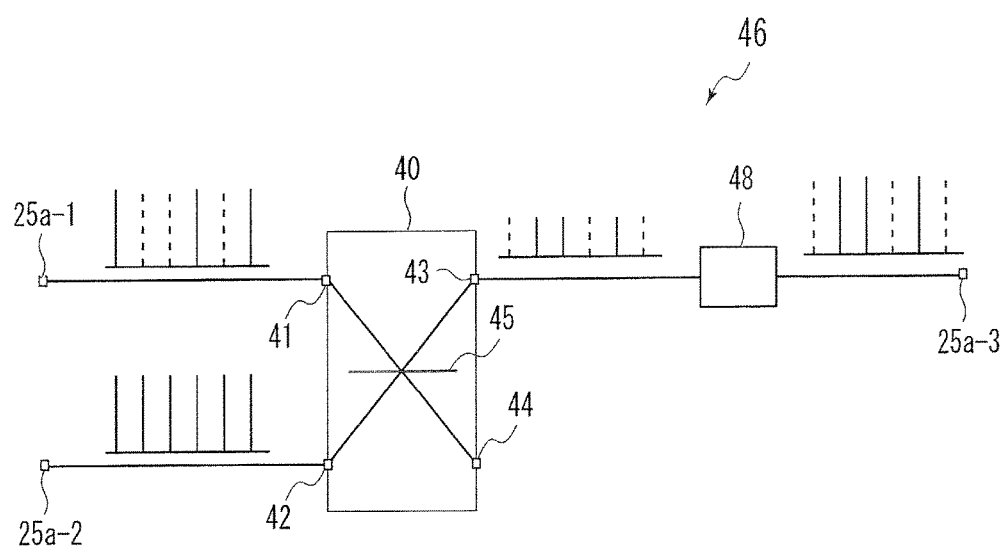
FIG. 16 is a diagram illustrating functions of the second NOT circuit.

The output level adjustment unit 48 is used to configure the second NOT circuit 25 to output ON pulses of which the intensity is almost Is. The output level adjustment unit 46 as illustrated in FIG. 15 can be used as the output level adjustment unit 48. However, the optical pulses output from the connection unit 43 of the half mirror 40 are OFF pulses or optical pulses of which the intensity is almost Is/2 as schematically illustrated in FIG. 16. Therefore, an optical amplifier of which the amplification factor is almost 2 is used as the output level adjustment unit 48.

As described above, each logical circuit included in the second optical logic circuit, which is an optical logic circuit according to the second embodiment, performs NOT operations of the data pulse trains and logical operations between the data pulses without using non-linear optical effects. Therefore, the second optical logic circuit functions as a circuit for performing simultaneous add operations of plural pairs (m pairs, for example) of data Ak and Bk (k=1 to m) without causing a problem attributed to the existence of light with other wavelengths.

Third Embodiment

An optical logic circuit according to the third embodiment is an example of a multiplier for n-bit data (n=8, for example) which can be configured by using various logical circuits (hereinafter referred to as linear optical logic circuit) used in the first optical logic circuit and the second optical logic circuit as described above.

Figure 17:
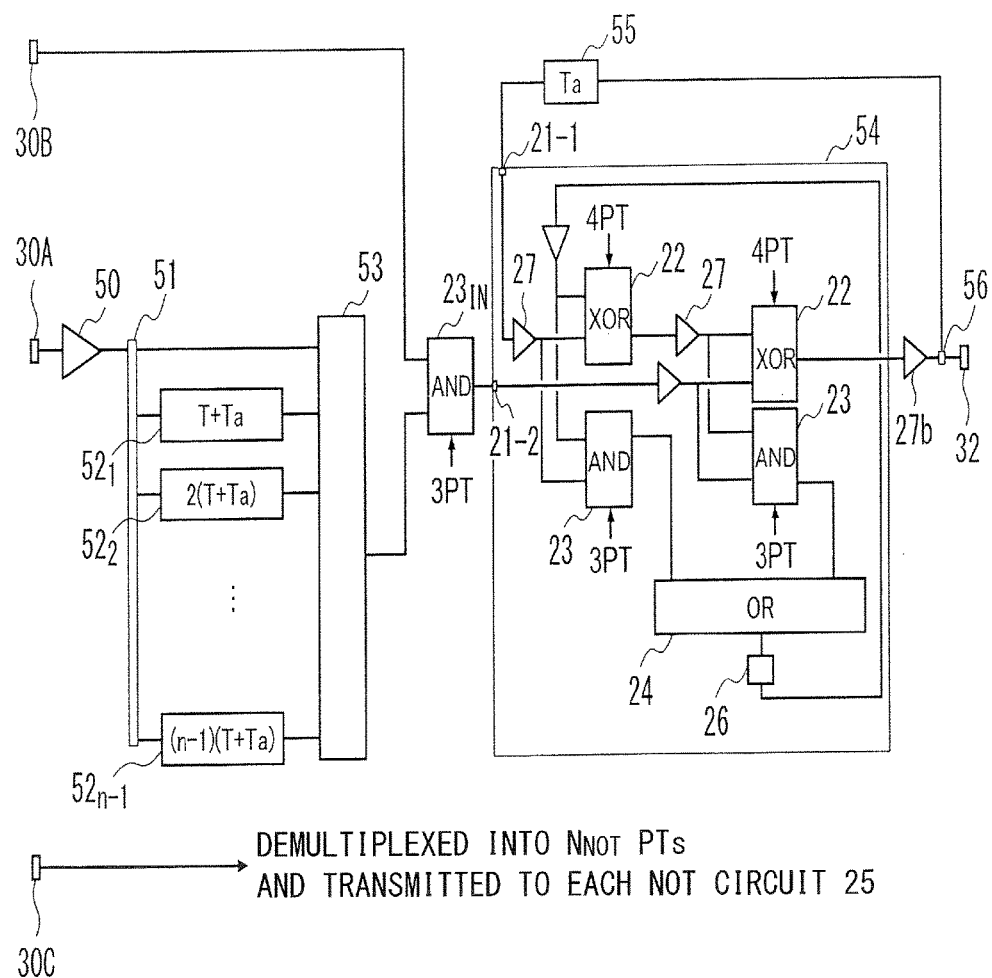
FIG. 17 is a configuration diagram schematically illustrating an optical logic circuit according to the third embodiment.

FIG. 17 illustrates a configuration of the optical logic circuit according to the third embodiment (hereinafter referred to as the third optical logic circuit).

As illustrated in FIG. 17, the third optical logic circuit includes input ports 30A to 30C, an optical amplifier 50, an optical demultiplexer 51, n−1 optical delay circuit $52_1$ to $52_{n-1}$, an optical multiplexer 53 and an AND circuit $23_{IN}$. In addition, the third optical logic circuit also includes an adder circuit 54, an optical amplifier 27b, an optical delay circuit 55, an optical demultiplexer 56 and an output port 32.

The optical amplifier 50 connected with the input port 30A is an optical amplifier for amplifying optical signals of which the amplification factor is almost n. The optical demultiplexer 51 is an optical demultiplexer for demultiplexing an optical signal output from the optical amplifier 40 into n optical signals with the same intensity. The optical multiplexer 53 connected directly with the optical demultiplexer 51 or connected with the optical demultiplexer 51 via the optical delay circuit $52_k$ (k=1 to n−1) is an optical multiplexer for providing each optical signal output from the optical demultiplexer 51 for the AND circuit $23_{IN}$.

The optical delay circuit 52k is a device such as optical fiber for outputting input optical signals with a time delay of about (k−1)×(T+Ta). It is noted that the phrase "about (k−1)×(T+Ta)" means the time duration as described below.

That is, the time as described above means that the time when an optical pulse generated from a predetermined optical pulse is input into the AND circuit $23_{IN}$ via the optical delay circuit 52k is equal to the time when the time (k−1)×(T+Ta) elapses after another optical pulse generated from the predetermined optical pulse is input into the AND circuit 23IN without transmitting through the optical delay circuit 52k.

It is noted that the optical path length of each optical signal transmission path between the input port 30A and the AND circuit 23IN is the same with each other. The input port 30B is connected with the AND circuit $23_{IN}$ with a transmission path of which the optical path length is the same as the optical path length between the input port 30A and the AND circuit $23_{IN}$.

As is clear from the comparison between FIG. 1 and FIG. 17, the adder circuit 54 is a circuit which employs the same configuration as the adder 20. However, although the output from the optical delay circuit 26 is provided for the next adder 20 in FIG. 1, the output from the optical delay circuit 26 is provided for the part corresponding to the connection unit 21-3 of the adder 20 in FIG. 17. It is noted that the output from the optical delay circuit 26 is a carry signal.

As illustrated in FIG. 17, the output signals from the AND circuit $23_{IN}$ is input into the connection unit 21-2 of the adder circuit 54. In addition, the optical signals output from the XOR circuit 22 subsequent to the adder circuit 54 are input into the connection unit 21-1 of the adder circuit 54 via the optical amplifier 27b, the optical demultiplexer 56 and the optical delay circuit 55.

The optical amplifier 27b amplifies optical signals output from the XOR circuit 22 subsequent to the adder circuit 54. It is noted that the amplification factor of the optical amplifier 27b is almost 2. The optical demultiplexer 56 demultiplexes an optical signal output from the optical amplifier 27b into two optical signals with the same intensity. As illustrated in FIG. 17, one of the optical signals output from the optical demultiplexer 56 is provided for the output port 32 and the other of the optical signals is provided for the optical delay circuit 55.

The optical delay circuit 55 delays optical signals output from the XOR circuit 22 subsequent to the adder circuit 54 so as to input into the connection unit 21-1 of the adder circuit 54 when the time Ta (≥2T) elapses after the optical signals are output from the XOR circuit 22.

The usage and functions of the third optical logic circuit are described below with reference to an example in which the third optical logic circuit performs multiplication of n-bit data A and B.

When the third optical logic circuit performs multiplication of n-bit data A and B, a data pulse train D[A] is input into the input port 30A of the third optical logic circuit. In addition, the zeroth pulse train of which the intensity is $N_{NOT}$ times ($N_{NOT}=17$, in this example) as much as the intensity of D[A] is input into the input port 30C. And the first to nth bit pulse trains are sequentially input into the input port 30B with a time period of "Ta+T". It is noted that the kth (k=1 to n) bit pulse train is a data pulse train which indicates the same value as the value indicated by the kth pulse of D[B].

It is noted that the input of optical signals into the third optical logic circuit is performed by the first optical signal generation apparatus as illustrated in FIG. 2, for example. In this case, the modulators 65A and 65B of the first optical signal generation apparatus are controlled to achieve that the first optical pulse in the first bit pulse train, the first pulse of D[A] and one of the optical pulses in the zeroth pulse train simultaneously input into the third optical logic circuit.

That is, when the third optical logic circuit performs multiplication of n-bit data A and B, D[A] and the kth bit pulse train are alternately input into the AND circuit $23_{IN}$ with each time "Ta+T". It is noted that ai and bi (i=1 to n) are values of the ith bits of data A and B. The least significant bits of data A and B are the first bits thereof.

Figure 18:
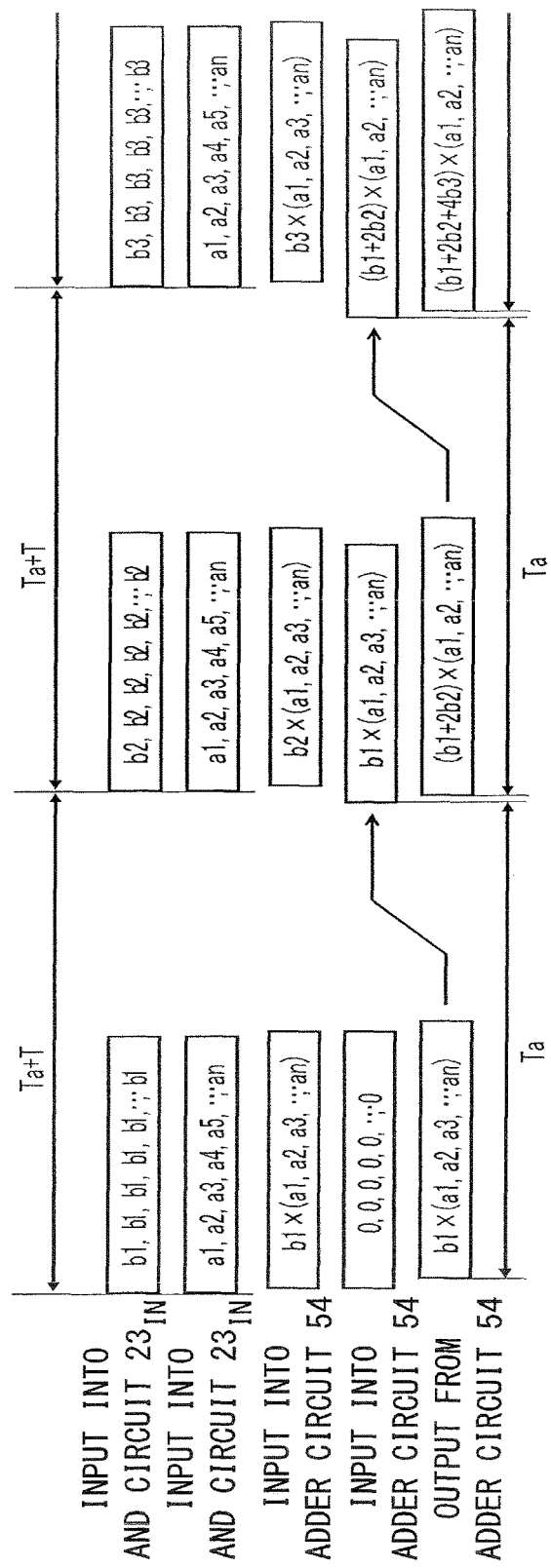
FIG. 18 is a diagram illustrating functions of the optical logic circuit according to the third embodiment.

When D[A] and the first bit pulse train are input into the AND circuit $23_{IN}$, the AND circuit $23_{IN}$ outputs a data pulse representing b1×A (b1×(a1, a2, a3, . . . , an) in FIG. 18). Therefore, although the data pulse train is input the connection unit 21-2 of the adder circuit 54, there is not data input into the connection unit 21-1 of the adder circuit 54 at that time. Namely, a data pulse train which indicates that the values of the bits of the data pulse train are "0" is input into the connection unit 21-1 of the adder circuit 54. Consequently, the adder circuit 54 outputs the data pulse train representing b1×A.

When Ta elapses after the adder circuit 54 outputs the data pulse, the data pulse train is input into the connection unit 21-1 of the adder circuit 54. And when Ta+T elapses after the data pulse train is input into the connection unit 21-1 of the adder circuit 54, a data pulse train representing b2×A is input into the connection unit 21-2 of the adder circuit 54.

Therefore, the data pulse train representing b2×A is added to the data pulse train representing b1×A with a one-bit shift. As a result, the adder circuit 54 outputs a data pulse train representing (b1+2b2)×A. And then the above process is repeatedly performed and a data pulse train representing the result of multiplication of 2n bits is output from the output port 32 when the nth bit pulse train is input into the adder circuit 54.

Each logical circuit employed in the third optical logic circuit corresponds to each logical circuit employed in the first or second optical logic circuit. Therefore, the third optical logic circuit performs the simultaneous multiplication operation of m pairs of data Ak and Bk (k=1 to m), each logical circuit performs processes for a data pulse with each wavelength without influence from data pulses with the other wavelengths. Therefore, when the third optical logic circuit performs the simultaneous multiplication operation of m pairs of data Ak and Bk (k=1 to m), an optical signal which is a composite data pulse train and in which D[A1×B1] to D[Am×Bm] are superposed is output from the output port 32 regardless of the value of m.

Fourth Embodiment

The optical logic circuit according to the fourth embodiment is a circuit configured to perform various operations.

Figure 19:
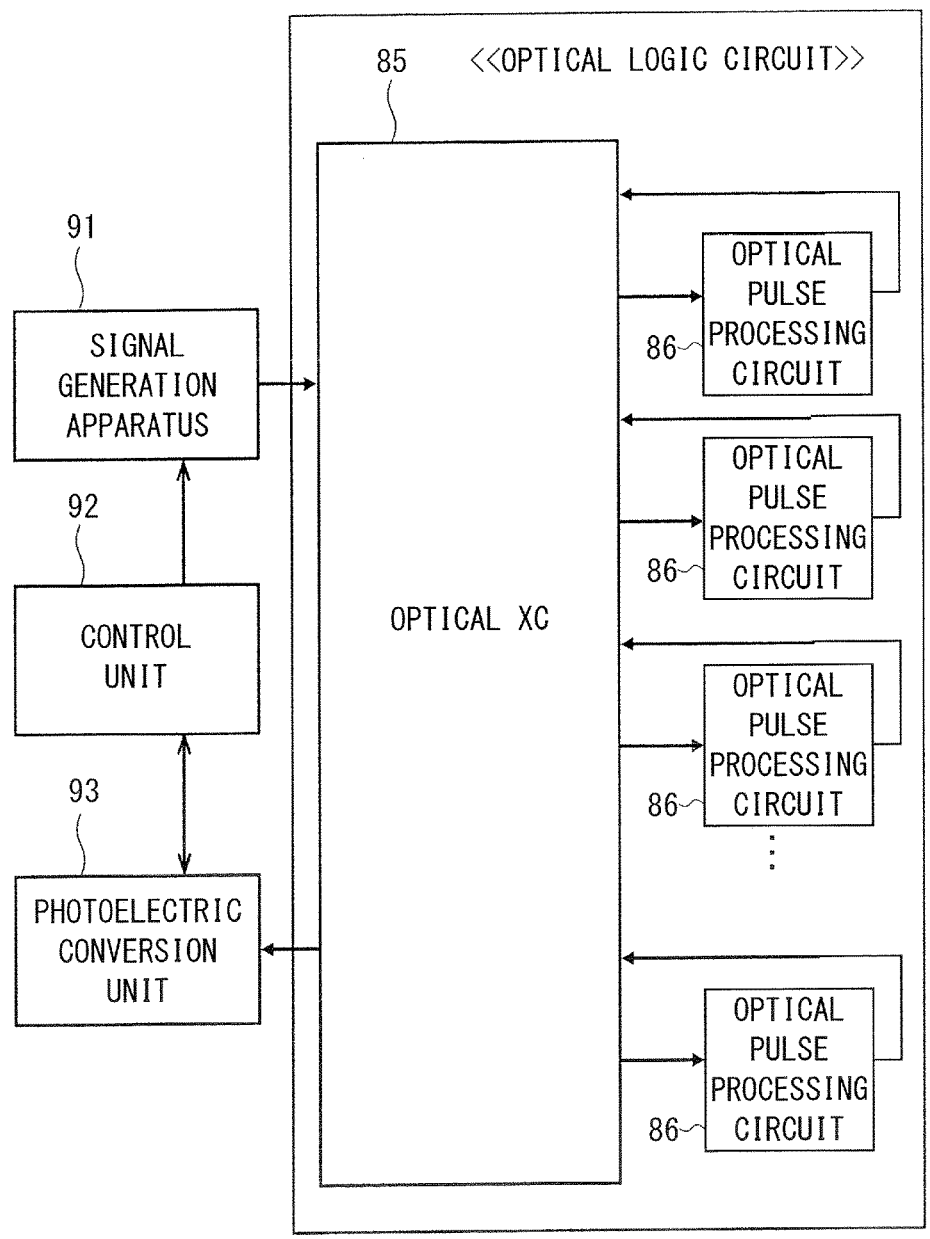
FIG. 19 is a configuration diagram schematically illustrating an optical logic circuit according to the fourth embodiment.

FIG. 19 illustrates an example of the configuration and the usage of the optical logic circuit according to the fourth embodiment.

As illustrated in FIG. 19, the optical logic circuit according to the fourth embodiment (hereinafter referred to as the fourth optical logic circuit) includes an optical cross connect (optical XC) 85 and a plurality of optical pulse processing circuits 86. In addition, the fourth optical logic circuit is combined with a signal generation apparatus 91, a control unit 92 and a photoelectric conversion unit 93.

An apparatus (hereinafter referred to as the second apparatus) which can be achieved by providing a function of generating control optical signals for the second signal generation apparatus as illustrated in FIG. 4 is used as the signal generation apparatus 91. It is noted that the control optical signals are signals which are generated by modulating a part of optical signals output from the generation source 71 and the intensity of each ON pulse of the control optical signals is almost Is. The control optical signals are hereinafter referred to as a composite control pulse train.

It is also noted that an apparatus (hereinafter referred to as the first apparatus) which can be achieved by providing a function of generating the control optical signals for the first signal generation apparatus as illustrated in FIG. 2 is used as the signal generation apparatus 91. In this case, the control optical signals are signals which are generated by modulating a part of optical signals output from the generation source 61 and the intensity of each ON pulse of the control optical signal is almost Is. The control optical signals are hereinafter referred to as a control pulse train.

The photoelectric conversion unit 93 is a unit configured to convert optical signals output from the optical XC 85 into digital data. When the second apparatus is used as the signal generation apparatus 91, a unit which includes a WDM optical demultiplexer for demultiplexing an optical signal output from the optical XC 85 into m data pulse trains with wavelengths λ1 to λm and m photoelectric conversion apparatuses for each wavelength, for example, is used. In addition, when the first apparatus is used as the signal generation apparatus 91, one photoelectric conversion apparatus is used as the photoelectric conversion unit 93, for example.

The control unit 92 is a unit configured to control the signal generation apparatus 91 and the photoelectric conversion unit 93 to achieve that desired operations are performed by the fourth optical logic circuit. A computer which includes a communication interface for the signal generation apparatus 91 and a communication interface for the photoelectric conversion unit 93, for example, is used. It is noted that when the optical pulse processing circuit 86 connected with the optical XC 85 includes optical pulse processing circuits which are needed to be electrically controlled, a unit which can control the optical pulse processing circuits in the optical pulse processing circuit 86 is used as the control unit 92.

The optical XC 85 is a unit configured to connect an output port of an arbitrary unit such as the signal generation apparatus 91 and the optical pulse processing circuit 96 which are connected with the optical XC 85 with an input port of an another arbitrary unit such as the optical pulse processing circuit 96 and the photoelectric conversion unit 93. The optical XC 85 can be achieved by combining optical multiplexers and optical demultiplexers which are configured by using linear optical logic circuits as described above as various logical circuits employed in the first to the third optical logic circuits.

Figure 20:
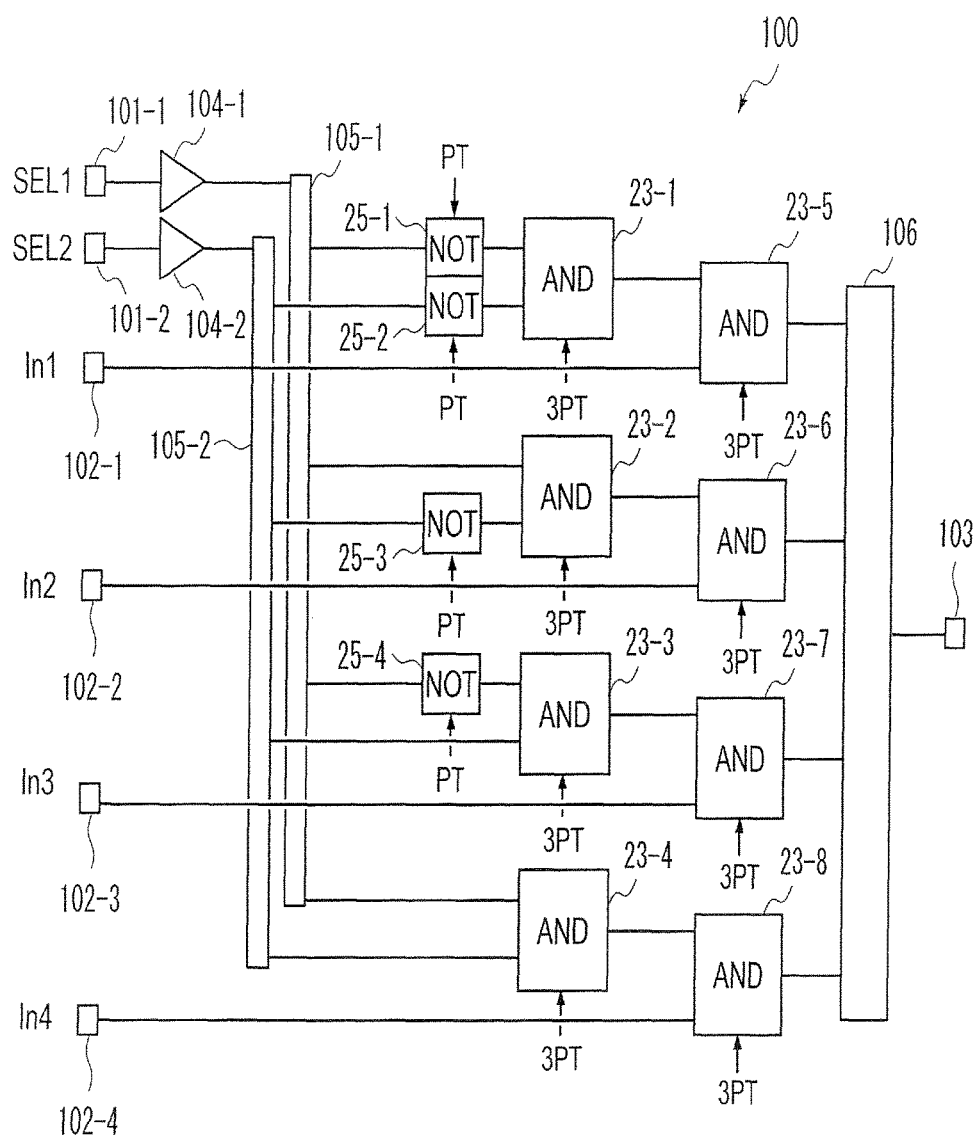
FIG. 20 is a configuration diagram schematically illustrating an example of an optical multiplexer.
Figure 21:
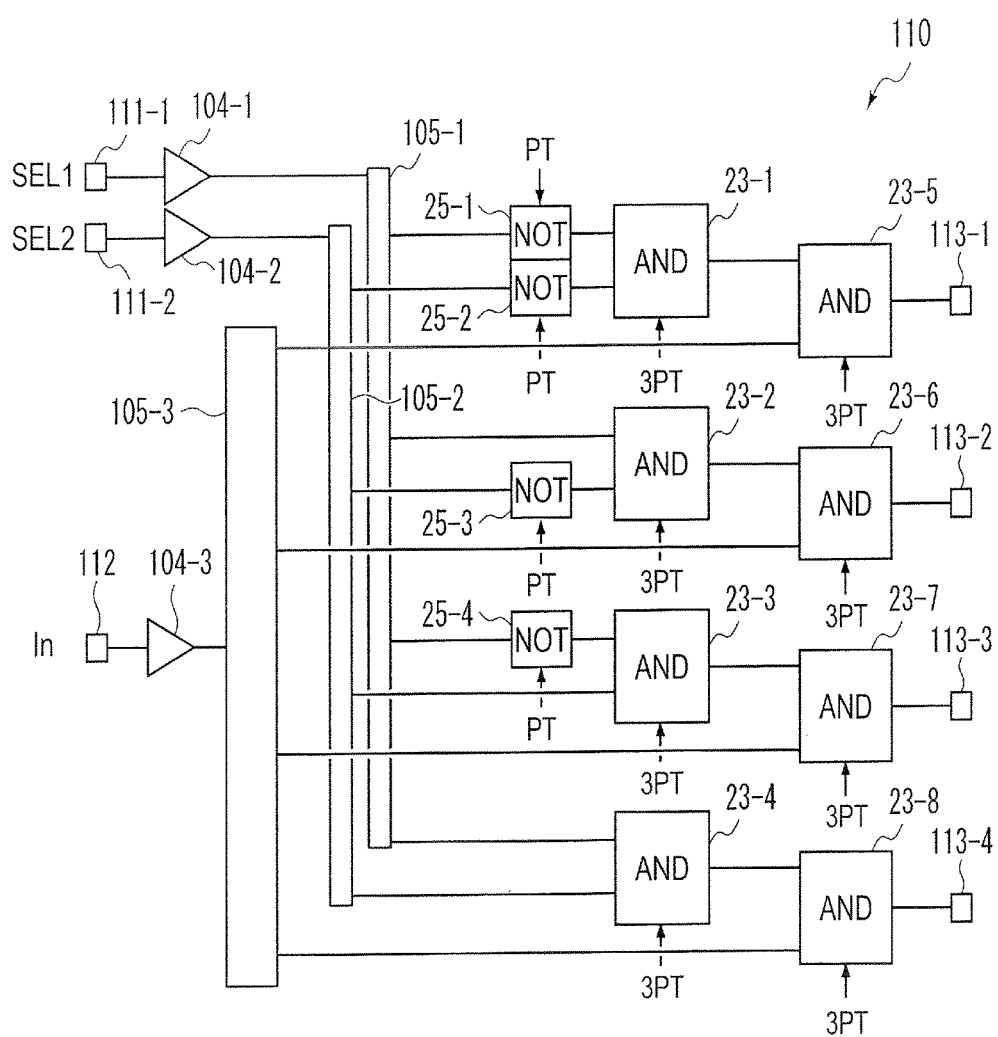
FIG. 21 is a configuration diagram schematically illustrating an example of an optical demultiplexer.

FIGS. 20 and 21 illustrate examples of the optical multiplexer and the optical demultiplexer used as the elements of the optical XC 85.

The optical multiplexing apparatus 100 as illustrated in FIG. 20 is an optical multiplexer with four inputs and one output. As illustrated in FIG. 20, the optical multiplexing apparatus 100 includes input ports 101-1, 101-2 and 102-1 to 102-4, and an output port 103. In addition, the optical multiplexing apparatus 100 includes optical amplifiers 104-1 and 104-2, optical demultiplexers 105-1 and 105-2, NOT circuits 25-1 to 25-4, AND circuits 23-1 to 23-8 and an optical multiplexer 106.

Data signals In1 to In4 which are data pulse trains or composite data pulse trains are input into the input ports 102-1 to 102-4, respectively. Control optical signals SEL1 and SEL2 which are control pulse trains or composite control pulse trains are input into the input ports 101-1 and 101-2, respectively.

The amplification factors of the optical amplifiers 104-1 and 104-2 are almost four. The optical demultiplexers 105-1 and 105-2 demultiplex an input optical signal into four optical signals of which the intensities are similar to each other. That is, the optical circuit which employs the optical amplifier 104-1 and the optical demultiplexer 105-1 outputs four optical signals of which the intensities are similar to the intensity of the optical signal SEL1. And the optical circuit which employs the optical amplifier 104-2 and the optical demultiplexer 105-2 outputs four optical signals of which the intensities are similar to the intensity of the optical signal SEL2. It is noted in the following descriptions that optical signals which are output from the optical demultiplexers 105-1 and 105-2 and of which the intensities are similar to the intensities of the signals SEL1 and SEL2 are referred to as SEL1 and SEL2.

As illustrated in FIG. 20, as a pair of SEL1 and SEL2 output from the two optical demultiplexers 105, SEL1 and SEL2 are inverted by the NOT circuit 25-1 and 25-2 and input into the AND circuit 23-1. As for another pair of SEL1 and SEL2 output from the two optical demultiplexers 105, SEL1 and SEL2 are input into the AND circuit 23-2 while SEL2 is inverted by the NOT circuit 25-3. As for another pair of SEL1 and SEL2 output from the two optical demultiplexers 105, SEL1 and SEL2 are input into the AND circuit 23-2 while SEL2 is inverted by the NOT circuit 25-4. As for the remaining pair of SEL1 and SEL2, SEL1 and SEL2 are input into the AND circuit 23-4 without being inverted.

Output signals from the AND circuits 23-$k$ ($k$=1 to 4) are input into the AND circuits 23-($k$+4) along with data signals In$k$. And output signals from the AND circuits 23-5 to 23-8 are provided for the output port 103 via the optical multiplexer 106 which includes a function for multiplexing the input signals and outputting the multiplexed signals.

In addition, the optical path lengths of the optical signal transmission paths between the elements of the optical multiplexing apparatus 100 are determined to satisfy the following conditions.

The optical path lengths between the input port 101-1 and the AND circuits 23-$k$ and the optical path lengths between the input port 101-2 and the AND circuits 23-$k$ match with each other; and the optical path lengths between the input port 101-1 and the AND circuits 23-($k$+4) and the optical path lengths between the input ports 102-$k$ and the AND circuits 23-($k$+4) match with each other.

As a result the optical multiplexing apparatus 100 functions as described below.

The optical multiplexing apparatus 100 outputs a data signal In1 from the output port 103 while a control optical signal SEL1 in which the optical pulses with all of the wavelengths therein are OFF pulses and a control optical signal SEL2 in which the optical pulses with all of the wavelengths therein are OFF pulses are input into the optical multiplexing apparatus 100.

In addition, the optical multiplexing apparatus 100 outputs a data signal In2 from the output port 103 while a control optical signal SEL1 in which the optical pulses with all of the wavelengths therein are ON pulses and a control optical signal SEL2 in which the optical pulses with all of the wavelengths therein are OFF pulses are input into the optical multiplexing apparatus 100.

Further, the optical multiplexing apparatus 100 outputs a data signal In3 from the output port 103 while a control optical signal SEL1 in which the optical pulses with all of the wavelengths therein are OFF pulses and a control optical signal SEL2 in which the optical pulses with all of the wavelengths therein are ON pulses are input into the optical multiplexing apparatus 100.

Moreover, the optical multiplexing apparatus 100 outputs a data signal In4 from the output port 103 while a control optical signal SEL1 in which the optical pulses with all of the wavelengths therein are ON pulses and a control optical signal SEL2 in which the optical pulses with all of the wavelengths therein are ON pulses are input into the optical multiplexing apparatus 100.

The optical demultiplexing apparatus 110 as illustrated in FIG. 21 is a demultiplexer with one input and four outputs. As illustrated in FIG. 21, the optical demultiplexing apparatus 110 includes input ports 111-1, 111-2 and 112-1, an optical multiplexer 105-3 and output ports 113-1 to 113-4. In addition, the optical demultiplexing apparatus 110 includes optical amplifiers 114-1 and 114-2, optical demultiplexers 105-1 and 105-2, NOT circuits 25-1 to 25-4, and AND circuits 23-1 to 23-8.

Data signals In are input into the input port 112. Control optical signals SEL1 and SEL2 for the optical demultiplexing apparatus 110 are input into the input ports 111-1 and 111-2, respectively.

The optical amplifiers 104-1 and 104-2, the optical demultiplexers 105-1 and 105-2, the NOT circuits 25-1 to 25-4 and the AND circuits 23-1 to 23-8 correspond to the counterparts included in the optical multiplexing apparatus 100.

Similar to the optical demultiplexers 105-1 and 105-2, the optical demultiplexer 105-3 demultiplexes an input optical signal into four optical signals of which the intensities are similar to each other.

In addition, the optical path lengths of the optical signal transmission paths between the elements of the optical demultiplexing apparatus 110 are determined to satisfy the following conditions.

The optical path lengths between the input port 111-1 and the AND circuits 23-$k$ and the optical path lengths between the input port 111-2 and the AND circuits 23-$k$ match with each other; and the optical path lengths between the input port 111-1 and the AND circuits 23-($k$+4) and the optical path lengths between the input ports 112-$k$ and the AND circuits 23-($k$+4) match with each other.

As a result the optical demultiplexing apparatus 110 functions as described below.

The optical demultiplexing apparatus 110 outputs a data signal In from the output port 103-1 while a control optical signal SEL1 in which the optical pulses with all of the wavelengths therein are OFF pulses and a control optical signal SEL2 in which the optical pulses with all of the wavelengths therein are OFF pulses are input into the optical demultiplexing apparatus 110.

In addition, the optical demultiplexing apparatus 110 outputs a data signal In from the output port 103-2 while a control optical signal SEL1 in which the optical pulses with all of the wavelengths therein are ON pulses and a control optical signal SEL2 in which the optical pulses with all of the wavelengths therein are OFF pulses are input into the optical demultiplexing apparatus 110.

Further, the optical demultiplexing apparatus 110 outputs a data signal In from the output port 103-3 while a control optical signal SEL1 in which the optical pulses with all of the wavelengths therein are OFF pulses and a control optical signal SEL2 in which the optical pulses with all of the wavelengths therein are ON pulses are input into the optical demultiplexing apparatus 110.

Moreover, the optical demultiplexing apparatus 110 outputs a data signal In from the output port 103-4 while a control optical signal SEL1 in which the optical pulses with all of the wavelengths therein are ON pulses and a control optical signal SEL2 in which the optical pulses with all of the wavelengths therein are ON pulses are input into the optical demultiplexing apparatus 110.

As described above, linear optical logic circuits are used to achieve the optical multiplexing apparatus 100 and the optical demultiplexing apparatus 110 in which control optical signals SEL1 and SEL2 are used to control where the data signals are input into and output from. Therefore, when the number of the optical multiplexing apparatuses 100 and the optical demultiplexing apparatuses 110 and the circuit configurations including the number of the input ports 101 and 102 are modified according to the number of units to be employed, the optical XC 85 can connect the units with each other.

Each optical pulse processing circuit 86 connected with the optical XC 85 as illustrated in FIG. 19 is a circuit configured by using the linear optical logic circuit to process one or more than one data signals. The optical XC 85 can be connected with circuits as described below as the optical pulse processing circuit 86.

A circuit which employs the configuration similar to the first or the second optical logic circuit;

a circuit in which the selectors 10A and 10B of the first or the second optical logic circuit are replaced with the optical demultiplexing apparatuses which can be control led by the control optical signals;

a circuit which employs the configuration similar to the third optical logic circuit;

an optical D-flip-flop circuit; or an optical SR-flip-flop circuit.

The optical D-flip-flop circuit and the optical SR-flip-flop circuit which can be used as the optical pulse processing circuit 86 are described below. It is noted that as is the case with the various circuits as described above, each circuit described below can also be configured and manufactured to achieve that two optical pulses representing two values as operation targets are simultaneously input into the respective logical circuits.

Figure 22:
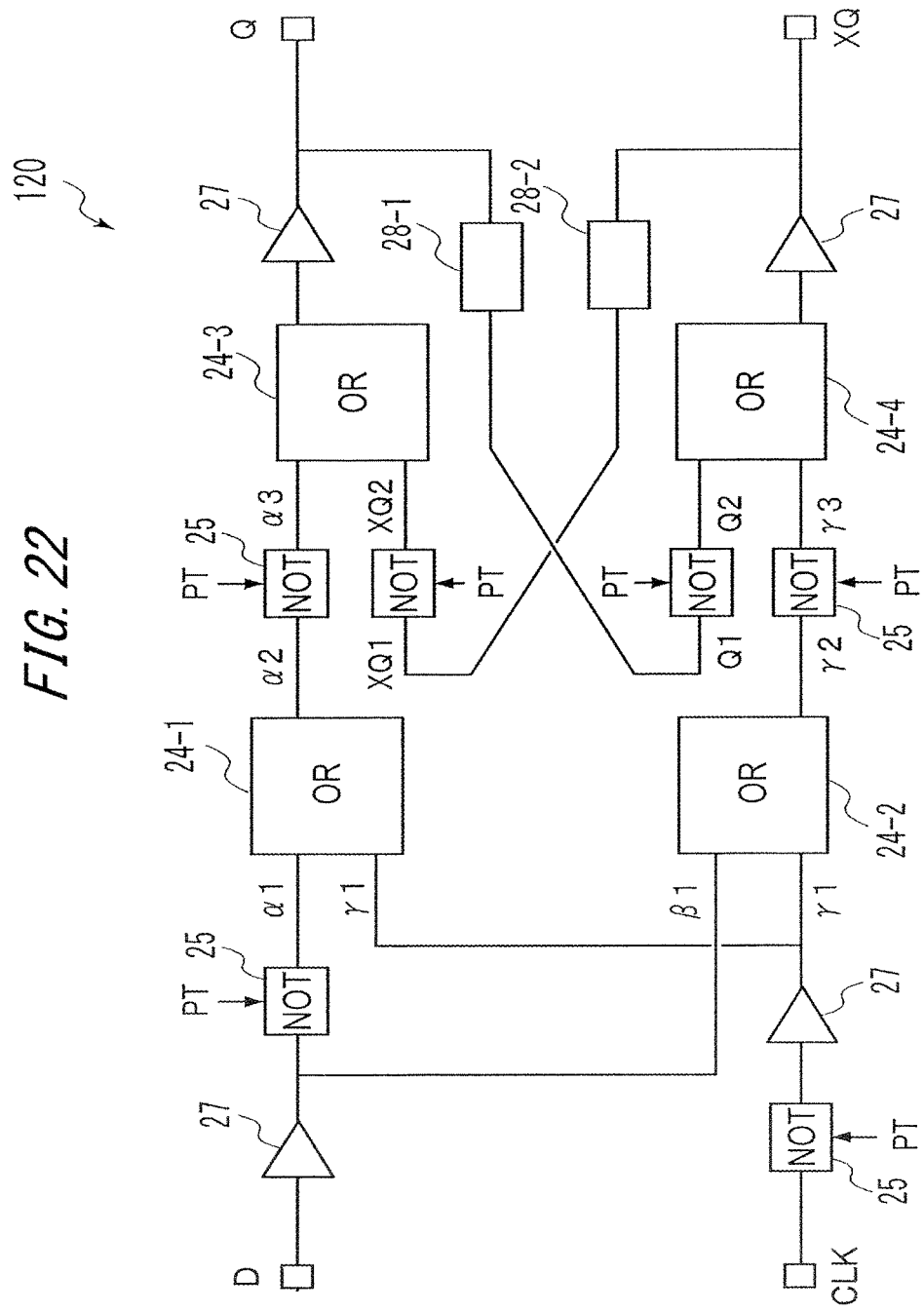
FIG. 22 is a configuration diagram schematically illustrating an example of an optical D-FF.
Figure 23:
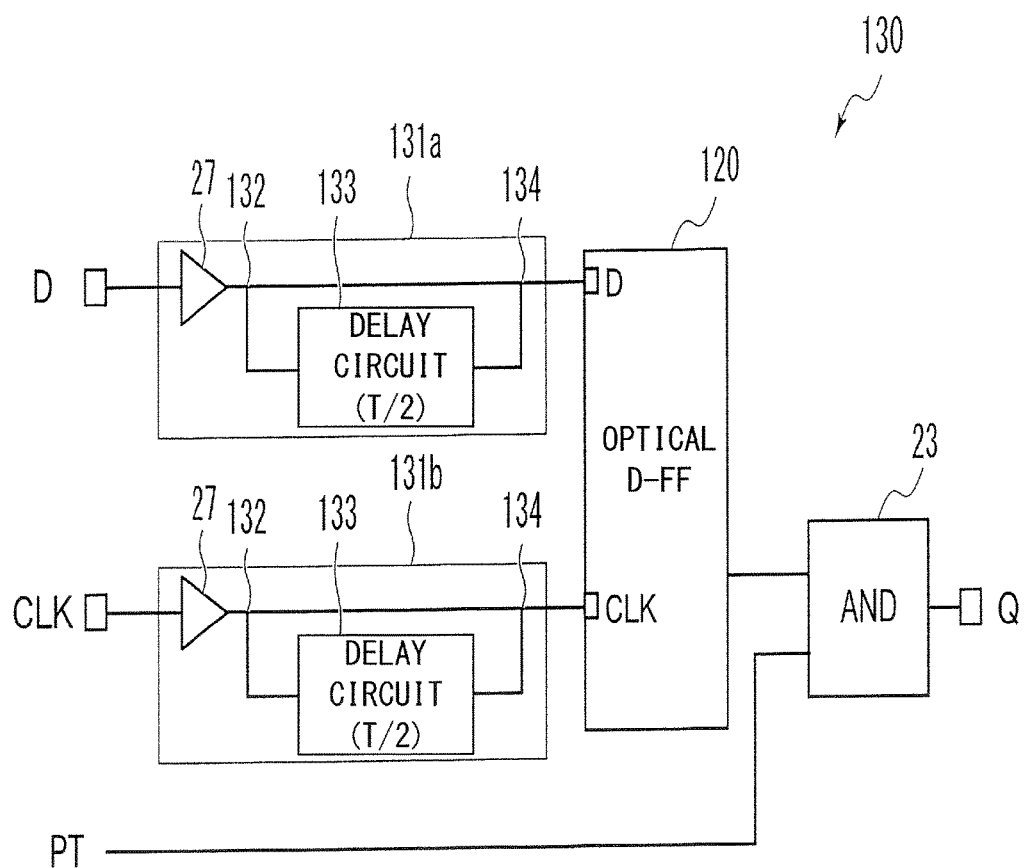
FIG. 23 is a configuration diagram schematically illustrating an example of an optical D-FF.

FIGS. 22 and 23 illustrate examples of the configurations of optical D-flip-flops which can be used as the optical pulse processing circuit 86. The D-flip-flop is also referred to as D-FF below.

First, the optical D-FF 120 of which the configuration is illustrated in FIG. 22 is described below.

As illustrated in FIG. 22, the optical D-FF 120 is a circuit in which each OR gate and each NOT gate employed in a conventional D-FF are replaced with an OR circuit 24 (24-1 to 24-4) and a NOT circuit 25, respectively. However, the optical D-FF 120 includes four optical amplifiers 27 of which the amplification factors are almost 2 and which provide data signals with the same intensity for each circuit in the optical D-FF.

The optical D-FF 120 also includes an optical delay circuit 28-1 configured to achieve that optical pulses generated from the OR circuit 24-3 into which two optical pulses with the same wavelength are input at time t are input into the OR circuit 24-4 at time t+T. In addition, the optical D-FF 120 also includes an optical delay circuit 28-2 configured to achieve that optical pulses generated from the OR circuit 24-4 into which two optical pulses with the same wavelength are input at time t are input into the OR circuit 24-3 at time t+T.

Next, the functions of the optical D-FF 120 are described below.

The optical D-FF 120 is a circuit into which data signals (data pulse trains or composite data pulse trains) are input into the D port of the optical D-FF 120 and control optical signals (control data pulse trains or composite control pulse trains) are input into the CLK port of the optical D-FF 120 as CLK. It is noted that the CLK input into the CLK port of the D-FF 120 is different from a clock used in a conventional electronic circuit. The CLK is a control optical signal in which OFF pulses are successive while the data signal input into the D port is retained.

Figure 24:
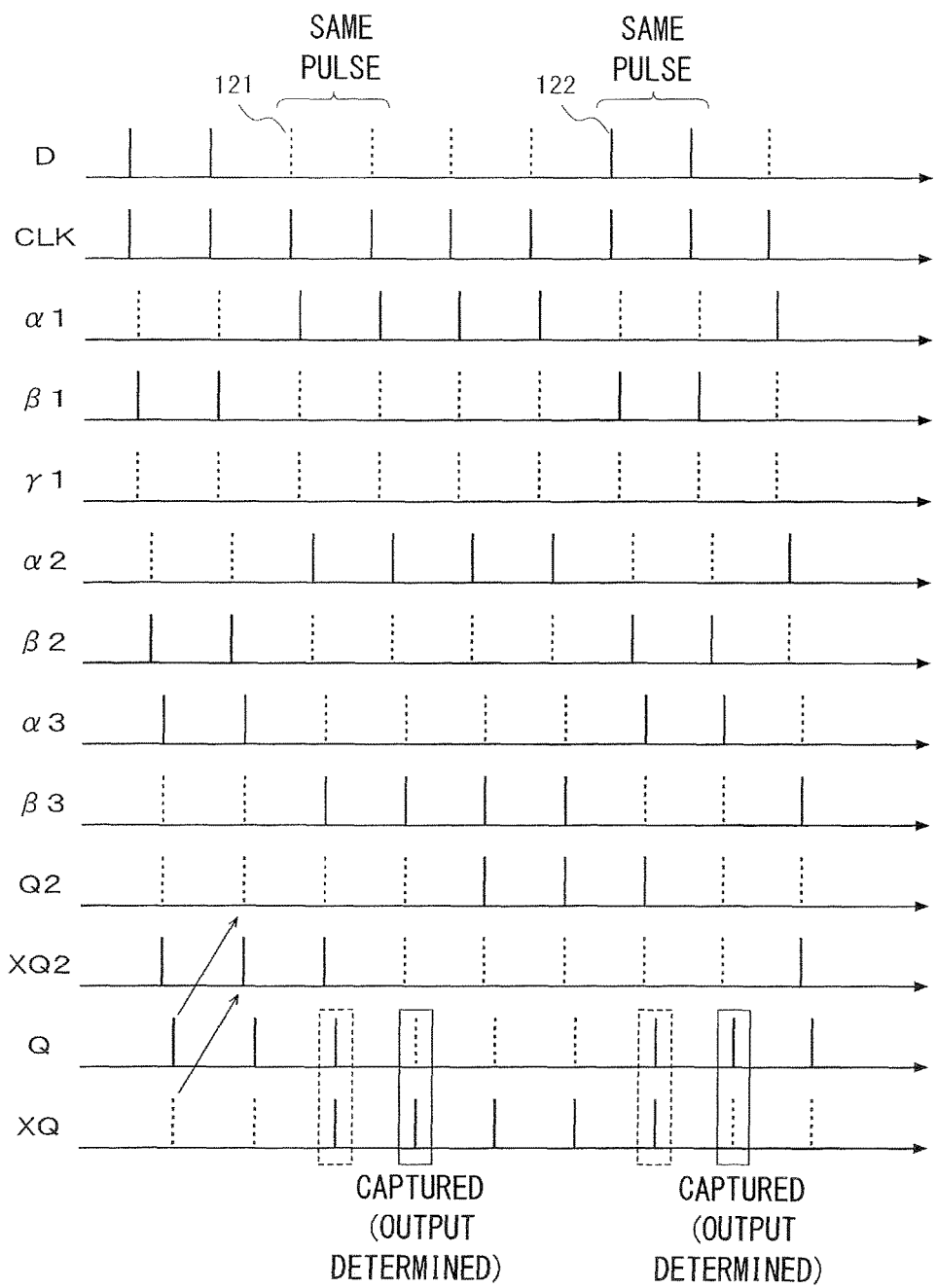
FIG. 24 is a timing chart for the optical D-FF illustrated in FIG. 22.

FIG. 24 illustrates a timing chart of the optical D-FF 120 when a data pulse train and a control pulse train in which ON pulses are successive are input into the D port and the CLK port, respectively in the optical D-FF 120.

As illustrated in FIG. 24, the optical D-FF 120 can capture input signals, which are optical pulses input into the D port. It is noted here that the phrase "capture input signals" means that "function to achieve that the ON/OFF states of the optical pulses input into the D port and the ON/OFF state of the optical pulses output from the Q port are the same with each other".

However, in the optical D-FF 120, an optical pulse such as an OFF pulse 121 and an ON pulse 122 as illustrated in FIG. 24 and a CLK pulse are input into the optical D-FF 120, the capture of the input signal is not completed. The capture of the input signal is completed when an optical pulse which is subsequent to and the same as the input optical pulse is input into the optical D-FF 120.

That is, the optical D-FF 120 has the disadvantage that information which corresponds to an optical pulse representing a value to be retained in the D-FF 120 has to be input twice into the D-FF 120.

Specifically, the optical D-FF 130 employs the configuration in which subharmonic circuits 131*a* and 131*b* are provided before the optical D-FF 120. Each subharmonic circuit 131*x* (x=a,b) uses an optical amplifier 27 and an optical demultiplexer 132 to demultiplex input optical signals, uses an optical delay circuit 133 to delay one of the demultiplexed optical signals for T/2, uses an optical multiplexer 134 to multiplex the delayed optical signal and the other of the demultiplexed optical signals and outputs the multiplexed optical signal.

That is, the subharmonic circuit 131*a* converts each input data pulse train into a data pulse train in which two identical data pulses are successive at a time and of which the number of pulses per unit time is twice as much as the input data pulse train. And the subharmonic circuit 131*a* provides the converted data pulse train for the D port of the optical D-FF 120. In addition, the harmonic circuit 131*b* converts each input control pulse train into a control pulse train in which two identical data pulses representing the same control value are successive at a time and of which the number of pulses per unit time is twice as much as the input data pulse train. And the subharmonic circuit 131*a* provides the converted data pulse train for the CLK port of the optical D-FF 120.

It is noted that the optical D-FF 130 includes a plurality of subharmonic circuits (not illustrated) employing the configuration similar to the configurations of the subharmonic circuits 131*a* and 131*b*. The optical D-FF 130 converts each standard pulse train PT into a standard pulse train PT in which the number of pulses is twice as much as the number of pulses in the standard pulse train PT before converted and provides each converted standard pulse train PT for the connection unit 25*a*-2 of each NOT circuit 25 in the optical D-FF 120.

In addition, the optical D-FF 130 includes an AND circuit 24 configured to provide the results of the AND operations of the signals (hereinafter referred to as subharmonic Q signals) output from the Q port of the optical D-FF 120 and the PTs (standard pulse trains or composite pulse trains). The optical transmission path for providing the subharmonic Q signals and the PTs for the AND circuit 24 is configured and manufactured to provide an optical pulse and a standard pulse which are generated from the second optical pulse (delayed optical pulse) by the optical D-FF 120 for the AND circuit 24 simultaneously.

As can be seen from the above descriptions, each time when optical pulses are input into the D port and the CLK port of the optical D-FF 130, optical pulses of which the intensities, which represent ON/OFF, are the same as the intensities of the input optical pulses are input twice into the D port and the CLK port of the optical D-FF 120 in the optical D-FF 130. Further, an optical pulse in which the number of pulses per unit time is twice as much as the number of pulses in the PT and of which the intensity is the same as the intensity of the PT are input into the connection unit 25*a*-2 of each NOT circuit 25 in the optical D-FF 130 (the optical D-FF 120).

And each logical circuit (the NOT circuit 25 and the OR circuit 24) in the optical D-FF 120 functions without problems even when the input cycle of the optical pulses is not T. Therefore, in the optical D-FF 130, each time when an optical pulse or a composite pulse is input into the CLK port, the capture of the optical signal input into the D port is completed. However, the subharmonic Q signals output from the Q port of the optical D-FF 120 include unnecessary optical pulses generated from the optical pulses input as the first optical pulses. Therefore, the AND circuit 24 is provided subsequent to the optical D-FF 120 to achieve that optical signals which do not include such unnecessary optical pulses are output from the Q port of the optical D-FF 130.

Figure 25:
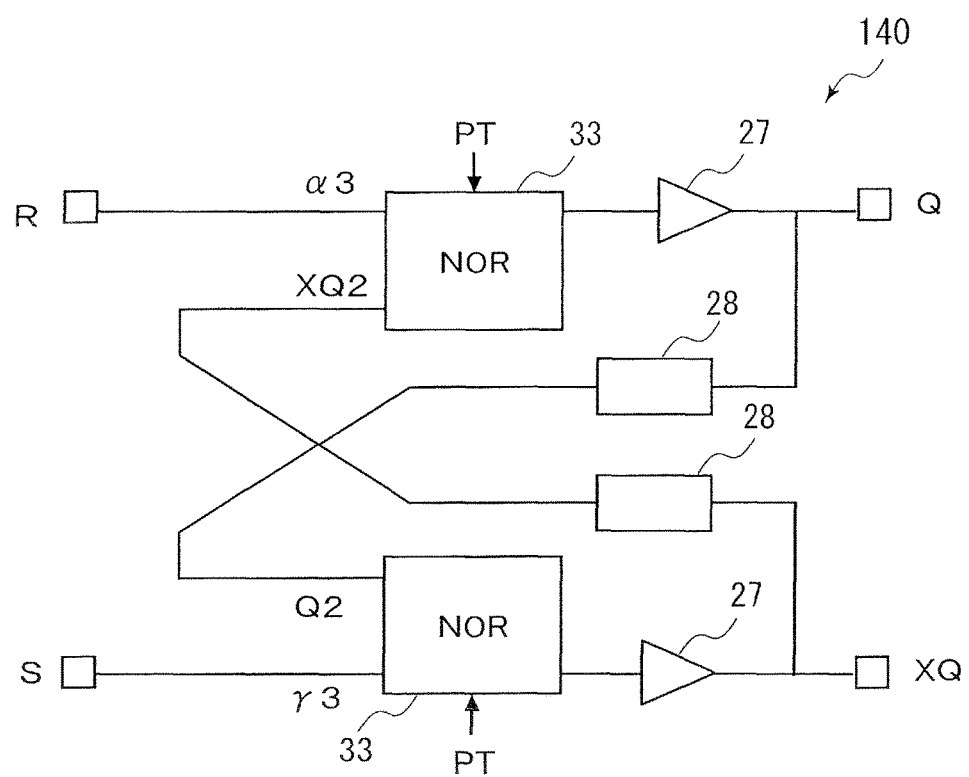
FIG. 25 is a configuration diagram schematically illustrating an example of an optical RS-FF.

FIG. 25 illustrates the configuration of an optical RS-flip-flop (hereinafter referred to as optical RS-FF) 140 which can be used as the optical pulse processing circuit 86.

The optical RS-FF 140 as illustrated in FIG. 25 is basically a circuit in which the NOR gate of the RS-FF is replaced with the NOR circuit 35. It is noted that the NOR circuit 35 is a circuit in which the NOT circuit 25 in FIGS. 8 and 12 is provided subsequent to the OR circuit 24 in FIGS. 9 and 11.

However, the RS-FF 140 includes an optical amplifier 27 configured to provide data signals with the same intensity for the NOR circuits 35. In addition, the RS-FF 140 also includes two optical delay circuits 28 configured to provide an optical pulse or a composite optical pulse output from one of the NOR circuits 35 for another of the NOR circuits 35 after time T elapses.

Figure 26:
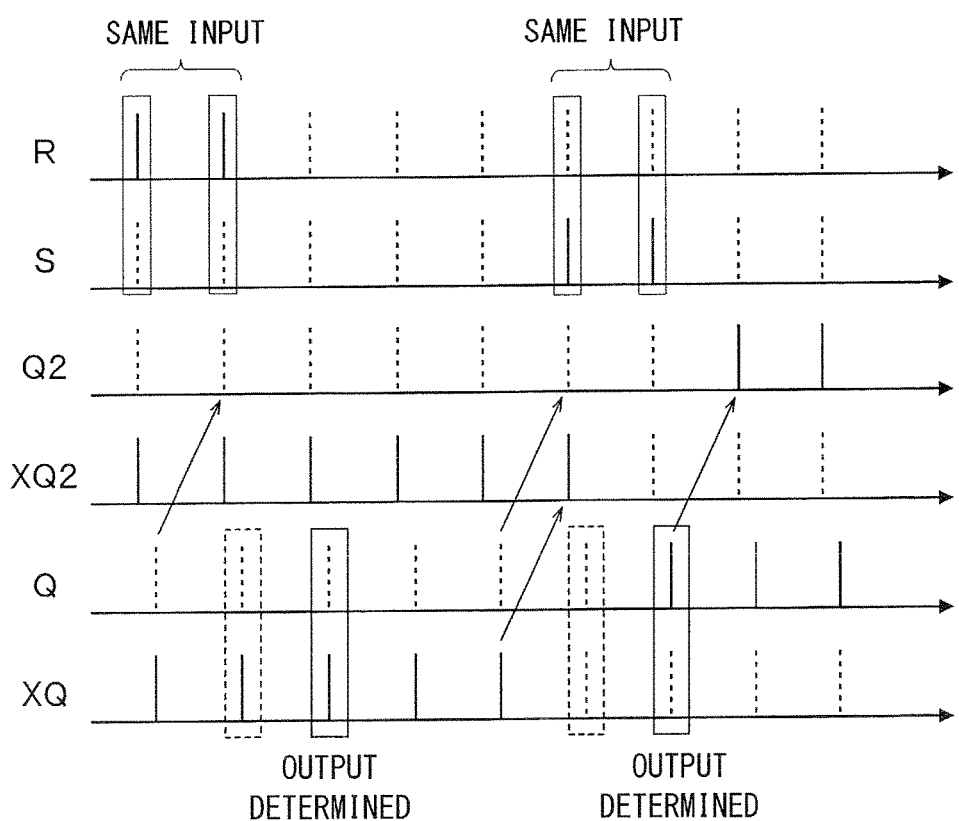
FIG. 26 is a timing chart for the optical RS-FF.

FIG. 26 illustrates a diagram of the optical RS-FF 140 when data pulse trains are input into the R port and the S port of the optical RS-FF 140.

As illustrated in FIG. 26, the RS-FF 140 basically functions as a conventional RS-FF functions. However, similar to the D-FF 120, the RS-FF 140 is a circuit in which the output signal is not determined unless the same combination of optical pulses is input into the R port and the S port twice.

Therefore, it is desirable to make the same improvements as the optical D-FF 120 as illustrated in FIG. 24 to the RS-FF 140.

The circuits which can be used as the optical pulse processing circuit 86 are not limited to the circuits as described above. For example, an optical shift register in which a plurality of D-FFs 140 as illustrated in FIG. 24 are combined or a JK-flip-flop in which a plurality of linear optical logic circuits are combined can be used as the optical pulse processing circuit 86.

As described above, the fourth optical logic circuit employs the configuration in which optical signals output from one of the signal generation circuits 91 can be input into another of the signal generation circuits 91 to process the optical signals. Each logical circuit included in the fourth optical logic circuit functions without problems when a plurality of data pulse trains and control pulse trains with different wavelengths are input into the fourth optical logic circuit. Therefore, various operations of various data can be performed by the fourth optical logic circuit.

Further, when the flip-flop circuit as described above is employed in a 3R reproduction repeater, the 3R reproduction repeater can achieve 3R reproduction of optical signals without converting the signals into electrical signals.

<<Variations>>

Various modifications can be applied to the optical logic circuits according to the embodiments as described above.

For example, phase adjustment circuits can be provided in the optical logic circuits as described above to achieve that the phase differences between optical signals after the optical logic circuits are manufactured. That is, the optical logic circuits can function without problems even when optical pulses are not simultaneously provided for several circuits in the optical logic circuits due to manufacturing errors etc.

The phase adjustment circuits at least include a function for applying the same phase difference to the optical signals with various wavelengths. Therefore, a circuit for which materials such as lithium niobate that achieves non-linear effects are used can be provided as the phase adjustment circuit. However, the manufacturing cost of such a phase adjustment circuit is relatively higher than that of other phase adjustment circuits.

Figure 27:
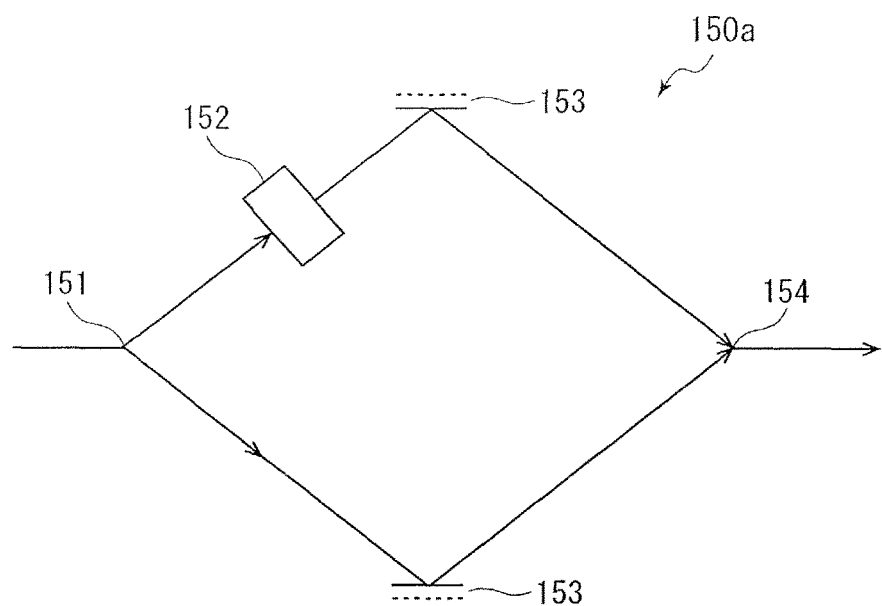
FIG. 27 is a configuration diagram schematically illustrating an example of a phase adjustment circuit which can be employed in an optical logic circuit.
Figure 28:
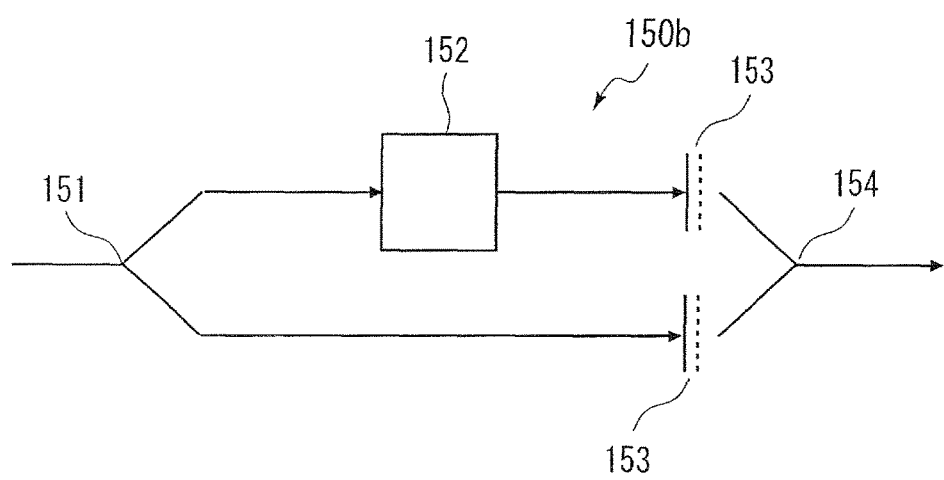
FIG. 28 is a configuration diagram schematically illustrating an example of a phase adjustment circuit which can be employed in an optical logic circuit.

Therefore, the phase adjustment circuits 150a and 150b as illustrated in FIGS. 27 and 28, respectively, can be preferably used because the manufacturing cost of the phase adjustment circuits 150a and 150b can be lower than that of the phase adjustment circuit as describe above.

The configuration and function of the phase adjustment circuit 150a is described below.

As illustrated in FIG. 27, the phase adjustment circuit 150a includes an optical demultiplexer 151, a phase changing unit 152, liquid crystal dots 153-1 and 153-2 and an optical multiplexer 154.

The liquid crystal dot 153 (153-1 and 153-2) is an element of which the reflection factor can be controlled or changed by electrical control signals. The optical multiplexer 154 multiplexes the light reflected by the two liquid crystal dots 153-1 and 153-2 in the phase adjustment circuit 150a.

The optical demultiplexer 151 demultiplexes an optical signal input into the optical demultiplexer 151 into two optical signals with the same intensity. The phase changing unit 152 achieves the same phase difference for each input optical signal with wavelength. A phases plate such as a ¼λ phase plate and a ½λ phase plate in which phase shifts can be achieved in a wide band of wavelength and a unit in which a phase difference with a predetermined amount can be achieved for the signals with wavelengths input into the optical logic circuit can be used as the phase changing unit 152.

That is, when two out-of-phase signals with the same wavelength are multiplexed, a signal with a phase determined according to the intensity ratio of the two signals is generated. As a result, the phase adjustment circuit 150a can adjust the phases of optical signals. However, when the phase adjustment circuit 150a changes the phase of an optical signal, the intensity of the optical signal is also changed. Therefore, when the phase adjustment circuit 150a is provided in the optical logic circuit, it is desirable to provide a circuit such as the output level adjustment unit 46 in FIG. 15 subsequent to the phase adjustment circuit 150a.

While the phase adjustment circuit 150a changes the intensity ratio of two signals to be multiplexed by changing the reflection factors of the two liquid crystal dots 153, the liquid crystal dots 153 is elements in which the transmission factors are changed as the reflection factors are changed.

Therefore, the elements employed in the phase adjustment circuit 150a can be used to configure the phase adjustment circuit 150b which outputs the result of multiplexing transmitted light from the two liquid crystal dots 153. It is noted that the phase adjustment circuit 150b is a circuit in which the intensity of the optical signal is changed as the phase of the optical signal is changed. Therefore, when the phase adjustment circuit 150b is provided in the optical logic circuit, it is desirable to provide a circuit such as the output level adjustment unit 46 in FIG. 15 subsequent to the phase adjustment circuit 150b.

In addition, apparatuses which uses liquid crystal to change the phase of the light alone have been developed. The apparatuses are referred to as spatial light modulators. Therefore, such a spatial light modulator can be used as the phase adjustment circuit.

Further, the phase adjustment circuits can be included in the second OR circuit 24 in FIG. 11 and the second NOT circuit 25 in FIG. 12.

Figure 29:
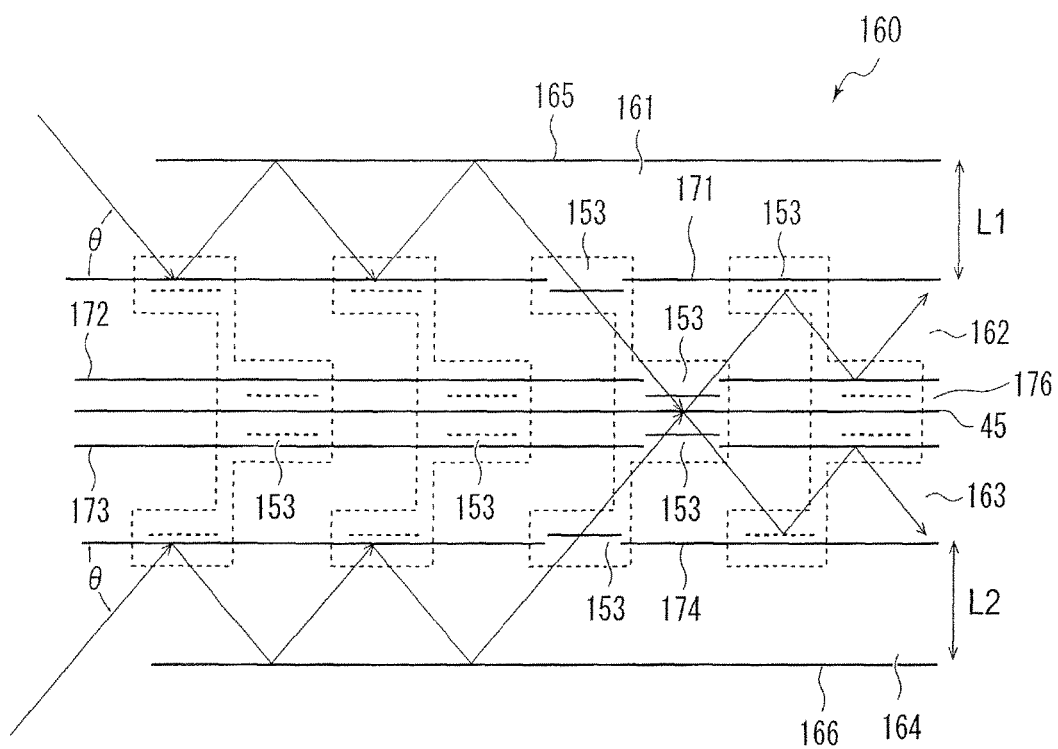
FIG. 29 is a configuration diagram schematically illustrating an example of main parts of the second OR circuit and the second NOT circuit employing a phase adjustment circuit.

FIG. 29 illustrates the configuration of the main part 160 of the second OR circuit 24 and the second NOT circuit 25 which include phase adjustment circuits.

The main part 160 corresponds to a combination of a part configured by a half mirror unit 40 of the second OR circuit 24 and optical transmission paths provided at the preceding stage and the subsequent stage of the half mirror unit 40 and a part configured by a half mirror unit 40 of the second NOT circuit 25 and optical transmission paths provided at the preceding stage and the subsequent stage of the half mirror unit 40.

As illustrated in FIG. 29, the main part 160 includes waveguide layers 161 to 164, mirror layers 165 and 167, liquid crystal mirror layers 171 to 174 and a half mirror layer 176.

The half mirror layer 176 is a layer in which the half mirror 45 which is an asymmetric mirror is sandwiched by light transmissive material layers. The liquid crystal layers 171 to 174 are layers in which a plurality of liquid crystal dots 153 are placed at regular intervals. As illustrated in FIG. 28, liquid crystal dots 153 are placed at positions which are plane-symmetrical about the half mirror layer 176 in the liquid crystal mirror layers 171 and 174. In addition, each liquid crystal dot 153 of the liquid crystal mirror layers 172 and 173 is placed roughly in the middle between the two neighboring liquid crystal dots 153 in the liquid crystal mirror layers 171 and 174. It is noted that the interval of the neighboring liquid crystal dots 153 is determined based on the thicknesses L1 and L2 of the waveguide layers 161 and 164 and the angles of incidence θ of the light incident to the waveguide layers 161 and 164.

The state of each liquid crystal dot 153 in the main part 160 is changed to the state in which the incident light is transmitted almost entirely or the state in which the incident light is reflected almost entirely. It is noted that the main part 160 is generally configured and manufactured to achieve that the state of the liquid crystal dots 153 are controlled on a basis of four liquid crystal dots surrounded with each dotted line.

The mirror layer 165 is a layer which reflects light reflected by the liquid crystal mirror layer 171 (the liquid crystal dots 153 in the liquid crystal mirror layer 141). The reflection factor of the mirror layer 165 is almost 1. In addition, the mirror layer 166 is a layer which reflects light reflected by the liquid crystal mirror layer 174. The reflection factor of the mirror layer 166 is almost 1.

The waveguide layers 161 to 164 are configured by a light transmissive material. The thicknesses of the waveguide layers 162 and 163 are set to be the thickness L1 of the waveguide layer 161 or the thickness L2 of the waveguide layer 162. It is assumed that the difference between the thickness L1 of the waveguide layer 161 and the thickness L2 of the waveguide layer 164 is several nanometers (5 nm, for example).

As described above, when the combination of the liquid crystal dots 153 which is in the light transmissive state is shifted to the combination of the neighboring liquid crystal dots 153 in the main part 160, the phase difference between the two input optical signals increases or decreases by "2(L1−L2)/sine".

Therefore, when the output level adjustment 46 or 48 is connected to the right side of the main part 160 in FIG. 29, the second OR circuit 24 or the second NOT circuit 25 which includes the phase adjustment circuit can be achieved.

Additionally, data pulse trains can be configured to be data pulse trains in which data pulses and ON pulses which are not data pulses are alternated in order to configure the output level adjustment units 24c and 46 by using the waveguide material 83 in which SBS occurs. However, when such data pulse trains (referred to as alternation pulse trains) are input into the NOT circuit 25, the NOT circuit 25 converts the alternation pulse trains into pulse trains which are not alternation pulse trains. When the alternation pulse trains are converted into pulse trains which are not alternation pulse trains, the objective of configuring the output level adjustment units 24c and 46 by using the waveguide material 83 in which SBS occurs cannot be easily achieved. Therefore, when alternation pulse trains are used as the data pulse trains, the optical logic circuit is configured as a circuit in which ON pulse trains with pulse period 2T are added to the pulse trains output from the NOT circuits 25 to achieve that the output pulse trains become alternation pulse trains.

Further, the optical logic circuit as described above can be modified to a circuit in which standard pulse trains PT or composite standard pulse trains PT are input into the input port 30C, that is, a circuit which amplifies input PTs to generate $N_{NOT}$ pieces of PTs.

Moreover, the optical logic circuit can be modified to a circuit which signals corresponding to data pulse trains are input into and output from in parallel. And an apparatus which employs a configuration different from the configurations of the first and the second signal generation apparatuses can be used to provide optical signals for the optical logic circuit.

In addition, the NOT circuits as described above can be used to achieve the optical logic circuit. That is, the optical logic circuit can be configured to include:

a receiving unit configured to receive a data pulse which is an ON pulse of which a wavelength and an intensity are similar to a wavelength and an intensity of a standard optical pulse or an OFF pulse obtained by applying OFF modulation to the standard optical pulse;

a reproduction unit configured to reproduce a timing of the received data pulse; and a transmission unit configured to transmit a data pulse in which the timing of the received data pulse is reproduced, wherein the reproduction unit includes a NOT circuit which reflects the input data pulse by fixed end reflection, multiplexes the reflected data pulse and the standard optical pulse and outputs the multiplexed pulse.

According to one aspect, the client apparatus can avoid the interruption of the displaying of the content even when the type of content transferred to the client apparatus is changed during the streaming of the content.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical logic circuit, comprising:
a NOT circuit configured to reflect by fixed end reflection an data pulse input into the optical logic circuit which is an ON pulse of which a wavelength and an intensity are similar to a wavelength and an intensity of a standard optical pulse or which is an OFF pulse obtained by applying OFF modulation to the standard optical pulse, multiplex the reflected data pulse and the standard optical pulse and output the multiplexed pulse, wherein
the NOT circuit includes:
a half mirror configured to reflect the input data pulse by fixed end reflection and multiplex the reflected data pulse and the standard optical pulse; and
an optical amplifier configured to amplify an intensity of the multiplexed pulse almost twice.

2. The optical logic circuit according to claim 1, further comprising:
an OR circuit including a multiplexer configured to multiplex the reflected data pulse and the standard optical pulse and a waveguide material in which induced Brillouin scattering occurs,
wherein an optical pulse output from the multiplexer is input into the waveguide material.

3. The optical logic circuit according to claim 2, further comprising:
a phase adjustment circuit configured to adjust a phase of an optical pulse,
wherein the optical pulse of which the phase is adjusted by the phase adjustment circuit is input into the OR circuit.

4. The optical logic circuit according to claim 3, wherein the phase adjustment circuit includes a liquid crystal dot.

5. The optical logic circuit according to claim 2, further comprising:
a first optical pulse processing circuit configured to perform a first logical operation;
a second optical pulse processing circuit configured to perform a second logical operation; and
a selector configured to output the data pulse input into the optical logic circuit to one of the first optical pulse processing circuit and the second optical pulse processing circuit,
wherein the first optical pulse processing circuit includes at least one of the NOT circuit and the OR circuit and the second optical pulse processing circuit includes at least one of the NOT circuit and the OR circuit.

6. The optical logic circuit according to claim 1, further comprising:
a phase adjustment circuit configured to adjust a phase of an optical pulse,
wherein the optical pulse of which the phase is adjusted by the phase adjustment circuit is input into the NOT circuit.

7. The optical logic circuit according to claim 6, wherein the phase adjustment circuit includes a liquid crystal dot.

8. The optical logic circuit according to claim 1, further comprising a flip-flop including the NOT circuit, wherein an output pulse from the flip-flop is input into the flip-flop as feedback with a delay of one bit.

9. The optical logic circuit according to claim 8, further comprising a circuit configured to convert the data pulse input into the optical logic circuit into a data pulse in which two identical optical pulses are successive at a time and provide the converted data pulse for the flip-flop.

10. An optical transmission apparatus, comprising:
- a receiving unit configured to receive a data pulse which is an ON pulse of which a wavelength and an intensity are similar to a wavelength and an intensity of a standard optical pulse or which is an OFF pulse obtained by applying OFF modulation to the standard optical pulse;
- a reproduction unit configured to reproduce a timing of the received data pulse; and
- a transmission unit configured to transmit a data pulse in which the timing of the received data pulse is reproduced,
- wherein the reproduction unit includes a NOT circuit which reflects the received data pulse by fixed end reflection, multiplexes the reflected data pulse and the standard optical pulse and outputs the multiplexed pulse, and
- the NOT circuit includes:
- a half mirror configured to reflect the received data pulse by fixed end reflection and multiplex the reflected data pulse and the standard optical pulse; and
- an optical amplifier configured to amplify an intensity of the multiplexed pulse almost twice.

* * * * *